US012787052B2

(12) United States Patent
Xie et al.

(10) Patent No.: US 12,787,052 B2
(45) Date of Patent: Nov. 3, 2026

(54) COMMUNICATION USING MULTIPLE ACTIVE SUBSCRIBER IDENTITY MODULES IN A DUAL SUBSCRIBER IDENTITY MODULE DUAL STANDBY DEVICE

(71) Applicant: QUALCOMM Incorporated, San Diego, CA (US)

(72) Inventors: Ling Xie, Beijing (CN); Tom Chin, San Diego, CA (US); Qingxin Chen, San Diego, CA (US); Reza Shahidi, La Jolla, CA (US); Bhupesh Manoharlal Umatt, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 721 days.

(21) Appl. No.: 18/042,586

(22) PCT Filed: Sep. 17, 2020

(86) PCT No.: PCT/CN2020/115834

§ 371 (c)(1),
(2) Date: Feb. 22, 2023

(87) PCT Pub. No.: WO2022/056773

PCT Pub. Date: Mar. 24, 2022

(65) Prior Publication Data

US 2023/0362978 A1 Nov. 9, 2023

(51) Int. Cl.
*H04W 72/566* (2023.01)
*H04W 8/18* (2009.01)

(52) U.S. Cl.
CPC ......... *H04W 72/569* (2023.01); *H04W 8/183* (2013.01)

(58) Field of Classification Search
CPC ... H04W 72/569; H04W 8/183; H04W 72/23; H04W 60/005; H04W 76/11;
(Continued)

(56) References Cited

U.S. PATENT DOCUMENTS 8,688,122 B2 4/2014 Mutya et al.
11,039,297 B1 * 6/2021 Desai ..................... H04L 65/65
(Continued)

FOREIGN PATENT DOCUMENTS

CN 107994917 A 5/2018
CN 111527761 A 8/2020
(Continued)

OTHER PUBLICATIONS

International Search Report and Written Opinion—PCT/CN2020/115834—ISA/EPO—May 26, 2021.
(Continued)

*Primary Examiner* — Brian J. Gillis
(74) *Attorney, Agent, or Firm* — QUALCOMM Incorporated

(57) ABSTRACT

Aspects of the disclosure relate to communication via a dual subscriber identification module (SIM) dual standby (DSDS) user equipment (UE) are disclosed. In an aspect, the DSDS UE may establish a first connection with a base station through a communication link via a first subscription using a frequency resource, and may establishing a second connection with the base station through the communication link via a second subscription using the frequency resource. The DSDS UE may further perform communication with the base station via at least one of the first subscription or the second subscription through the communication link using the frequency resource.

30 Claims, 21 Drawing Sheets

(58) Field of Classification Search
CPC ... H04L 5/1469; H04L 5/0096; H04L 5/0023; H04L 5/0044; H04L 5/0048
See application file for complete search history.

(56) References Cited

U.S. PATENT DOCUMENTS

| | | | | |
|---|---|---|---|---|
| 2013/0303181 | A1 | 11/2013 | Rajurkar et al. | |
| 2014/0342776 | A1 | 11/2014 | Viswanadham et al. | |
| 2017/0070877 | A1 * | 3/2017 | Shi | H04W 8/183 |
| 2018/0184309 | A1 | 6/2018 | Bhardwaj et al. | |
| 2022/0022252 | A1 * | 1/2022 | Lee | H04W 24/08 |

FOREIGN PATENT DOCUMENTS

| | | | |
|---|---|---|---|
| WO | 2013109476 | 7/2013 | |
| WO | WO-2018141081 A1 * | 8/2018 | H04W 8/183 |

OTHER PUBLICATIONS

3GPP TR 22-834V1 7.2.0: "3rd Generation Partnership Project, Technical Specification Group Services and System Aspects, Study on Support for Multi-USIM Devices (Release 17)", 3rd Generation Partnership Project (3GPP), Mobile Competence Centre, 650, Route Des Lucioles, F-06921 Sophia-Antipolis Cedex, France, vol. SAwGI, No. V17.2.0, Dec. 20, 2019, pp. 1-17, XP051840902, p. 6, section 3.1, 1. 8-12.

Supplementary European Search Report—EP20953631—Search Authority—Berlin—May 22, 2024.

* cited by examiner

650

| | SUBSCRIPTION 1 | | SUBSCRIPTION 2 | |
|---|---|---|---|---|
| | MCG (idle stack) | SCG | MCG (idle stack) | SCG |
| Dual stack | LTE | NR | LTE | |
| | | | NR | |
| | | | LTE | NR |
| | | | NR | LTE |
| | NR | LTE | LTE | |
| | | | NR | |
| | | | LTE | NR |
| | | | NR | LTE |
| | NR | NR | NR | |
| | | | NR | NR |

FIG. 6B

600

| | SUBSCRIPTION 1 | SUBSCRIPTION 2 |
|---|---|---|
| Single stack | NR | NR |
| | LTE | LTE |
| | WCDMA | WCDMA |
| | GSM | GSM |

FIG. 6A

COMMUNICATION USING MULTIPLE ACTIVE SUBSCRIBER IDENTITY MODULES IN A DUAL SUBSCRIBER IDENTITY MODULE DUAL STANDBY DEVICE

CROSS-REFERENCE TO RELATED APPLICATION(S)

This application is the U.S. national stage of PCT patent application number PCT/CN2020/115834 filed on Sep. 17, 2020.

TECHNICAL FIELD

The technology discussed below relates generally to wireless communication systems, and more particularly, to communication between a user equipment and a base station using multiple subscriptions.

INTRODUCTION

A user equipment (UE) often uses a subscription to connect to a service network, which provides one or more services such as a voice call service or a data service. For example, a subscription used by the UE may be associated with a subscription module or device such as a subscriber identity module (SIM) that the UE accesses to use the subscription. With development of the subscription based services, a UE that is capable of using two or more subscriptions are increasingly used. In one example, a UE may implement a dual SIM that allows the UE to connect to a service network using two different subscriptions respectively provided by two SIMs. Various Improvements for a UE configured to use multiple subscriptions are being studied.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Aspects of the disclosure relate to communication via a dual subscriber identification module (SIM) dual standby (DSDS) user equipment (UE) are disclosed. In an aspect, when a DSDS UE using multiple subscriptions/SIMs utilize the same frequency resource, the communications using the multiple subscriptions may be performed simultaneously. Various approaches are introduced to utilize such an DSDS UE.

In one example, a method of wireless communication by a DSDS UE configured to communicate with at least two subscriptions is disclosed. The method includes establishing a first connection with a base station through a communication link via a first subscription using a frequency resource, establishing a second connection with the base station through the communication link via a second subscription using the frequency resource, and performing communication with the base station via at least one of the first subscription or the second subscription through the communication link using the frequency resource.

In an aspect, the first connection and the second connection may be established with the base station using a same RAT. In an aspect, the communication link may be a frequency channel between the DSDS UE and the base station.

In an aspect, the method may further include determining that the one of the first and second subscriptions is a primary subscription based on one or more of following: determining whether one or more of the first and second subscriptions is a main data subscription, determining which of the first and second subscriptions has entered a connected mode first, determining which of the first and second subscriptions has entered an idle mode, and determining a type of first data communicated via the first subscription and a type of second data communicated via the second subscription.

In an aspect, the type of data communicated via the first subscription may indicate a first priority and the type of data communicated via the second subscription and a second priority, and the one of the first and second subscriptions may be determined as the primary subscription based on the first priority associated with the first data and the second priority associated with the second data.

In an aspect, the method may further include changing the primary subscription to be the other one of the first and second subscriptions in response to determining that the one of the first and second subscriptions has entered an idle mode and the other one of the first and second subscriptions is in a connected mode.

In an aspect, the method may further include changing the primary subscription back to be the one of the first and second subscriptions in response to determining that the one of the first and second subscriptions has entered a connected mode.

In an aspect, the method may further include monitoring, using one of the first and second subscriptions, for first control information associated with the first subscription based on a first subscription identifier and for second control information associated with the second subscription based on a second subscription identifier.

In an aspect, the one of the first and second subscriptions may be used for monitoring for the first control information and the second information in response to determining that the one of the first and second subscriptions is the primary subscription.

In an aspect, the first control information and the second control information may be first DCI and second DCI, respectively, where monitoring for the first control information and for the second control information may include monitoring a PDCCH with the first subscription identifier for the first DCI and with the second subscription identifier for the second DCI. In an aspect, the first subscription identifier may be a first C-RNTI and the second subscription identifier is a second C-RNTI.

In an aspect, performing the communication may include performing uplink communication based on at least one of the first control information or the second control information respectively associated with the at least one of the first subscription or the second subscription if the at least one of the first control information or the second control information includes an uplink scheduling grant, and receiving downlink communication based on the at least one of the first control information or the second control information respectively associated with the at least one of the first subscription or the second subscription if the at least one of the first control information or the second control information includes a downlink scheduling assignment. In an aspect, the uplink communication may be PUSCH communication and the downlink communication may be PDSCH communication.

In an aspect, performing communication with the base station may include receiving simultaneously first downlink communication via the first subscription and second downlink communication via the second subscription through the communication link using the frequency resource.

In an aspect, the communication with the base station may be performed based on monitoring for the first control information and for the second control information.

In an aspect, the method may further include changing the first connection for the first subscription by switching from the first frequency resource on a first communication link to a second frequency resource on a second communication link for the first connection. In an aspect, the method may further include monitoring, using the first subscription, for first control information associated with the first subscription based on resource. In an aspect, the method may further include monitoring, using the second subscription, for second control information associated with the second subscription based on a second subscription identifier on a second communication link via the second frequency resource.

In another example, a DSDS UE configured to communicate with at least two subscriptions for wireless communication is disclosed. The user equipment device includes at least one processor, a transceiver communicatively coupled to the at least one processor, and a memory communicatively coupled to the at least one processor. The at least one processor may be configured to establish a first connection with a base station through a communication link via a first subscription using a frequency resource, establish a second connection with the base station through the communication link via a second subscription using the frequency resource, and perform communication with the base station via at least one of the first subscription or the second subscription through the communication link using the frequency resource.

In another example, a non-transitory processor-readable storage medium having instructions for a DSDS UE configured to communicate with at least two subscriptions thereon may be disclosed. The instructions, when executed by a processing circuit, cause the processing circuit to establish a first connection with a base station through a communication link via a first subscription using a frequency resource, establish a second connection with the base station through the communication link via a second subscription using the frequency resource, and perform communication with the base station via at least one of the first subscription or the second subscription through the communication link using the frequency resource.

In a further example, a DSDS UE configured to communicate with at least two subscriptions for wireless communication may be disclosed. The DSDS UE includes means for establishing a first connection with a base station through a communication link via a first subscription using a frequency resource, means for establishing a second connection with the base station through the communication link via a second subscription using the frequency resource, and means for performing communication with the base station via at least one of the first subscription or the second subscription through the communication link using the frequency resource.

In one example, a method of wireless communication by a DSDS UE configured to communicate with at least two subscriptions is disclosed. The method includes establishing a first connection with a base station via a first subscription and a second connection with the base station via a second subscription using a first frequency resource for the first and second subscriptions, changing the first connection for the first subscription by switching from the first frequency resource to a second frequency resource for the first connection, changing the second connection for a second subscription by switching from the first frequency resource to the second frequency resource for the second connection, in response to changing the first connection for the first subscription, and performing communication via at least one of the first subscription or the second subscription using the second frequency resource. In an aspect, the first connection and the second connection may be established with the base station using a same RAT.

In an aspect, the method may further include determining that the one of the first and second subscriptions is a primary subscription based on one or more of following: determining whether one or more of the first and second subscriptions is a main data subscription, determining which of the first and second subscriptions has entered a connected mode first, determining which of the first and second subscriptions has entered an idle mode, and determining a type of first data communicated via the first subscription and a type of second data communicated via the second subscription.

In an aspect, the type of first data communicated via the first subscription may indicate a first priority and the type of first data communicated via the second subscription and a second priority, and the first subscription may be determined as the primary subscription based on the first priority associated with the first data and the second priority associated with the second data.

In an aspect, the method may further include changing the primary subscription to be the second subscription in response to determining that the first subscription has entered an idle mode and the second subscription is in a connected mode.

In an aspect, the method may further include changing the primary subscription back to be the first subscriptions in response to determining that the first subscriptions has entered a connected mode.

In an aspect, the method may further include performing a mobility measurement via the first subscription using the first frequency resource.

In an aspect, the method may further include after changing the first connection and prior to changing the second connection, performing first communication via the first subscription using the second frequency resource and performing second communication via the second subscription using the first frequency resource.

In an aspect, the method may further include after changing the first connection and prior to changing the second connection, transmitting, to the base station, an indication for the second frequency resource as a target frequency resource. In an aspect, the indication may be transmitted via UE assistance information.

In an aspect, changing the first connection for the first subscription may be based on the mobility measurement.

In an aspect, the first frequency resource may be associated with at least one of a first cell associated with the base station or a first BWP of the first cell, and the second frequency resource may be associated with at least one of a second cell associated with a second base station or a second BWP of the first cell.

In another example, a DSDS UE configured to communicate with at least two subscriptions for wireless communication is disclosed. The user equipment device includes at least one processor, a transceiver communicatively coupled to the at least one processor, and a memory communicatively coupled to the at least one processor. The at least one processor may be configured to establish a first connection with a base station via a first subscription and a second connection with the base station via a second subscription using a first frequency resource for the first and second subscriptions, change the first connection for the first subscription by switching from the first frequency resource to a second frequency resource for the first connection, change the second connection for a second subscription by switching from the first frequency resource to the second frequency resource for the second connection, in response to changing the first connection for the first subscription, and perform communication via at least one of the first subscription or the second subscription using the second frequency resource.

In another example, a non-transitory processor-readable storage medium having instructions for a DSDS UE configured to communicate with at least two subscriptions thereon may be disclosed. The instructions, when executed by a processing circuit, cause the processing circuit to establish a first connection with a base station via a first subscription and a second connection with the base station via a second subscription using a first frequency resource for the first and second subscriptions, change the first connection for the first subscription by switching from the first frequency resource to a second frequency resource for the first connection, change the second connection for a second subscription by switching from the first frequency resource to the second frequency resource for the second connection, in response to changing the first connection for the first subscription, and perform communication via at least one of the first subscription or the second subscription using the second frequency resource.

In a further example, a DSDS UE configured to communicate with at least two subscriptions for wireless communication may be disclosed. The DSDS UE includes means for means for establishing a first connection with a base station via a first subscription and a second connection with the base station via a second subscription using a first frequency resource for the first and second subscriptions, means for changing the first connection for the first subscription by switching from the first frequency resource to a second frequency resource for the first connection, means for changing the second connection for a second subscription by switching from the first frequency resource to the second frequency resource for the second connection, in response to changing the first connection for the first subscription, and means for performing communication via at least one of the first subscription or the second subscription using the second frequency resource.

In one example, a method of wireless communication by a base station is disclosed. The method includes establishing a first connection through a communication link via a first subscription of a DSDS user equipment (UE) using a frequency resource, the DSDS UE being configured to communicate with at least two subscriptions, establishing a second connection through the communication link via a second subscription of the DSDS UE using the frequency resource, and performing communication with the DSDS UE via at least one of the first subscription or the second subscription through the communication link using the frequency resource.

In an aspect, the first connection and the second connection may be established with the base station using a same RAT. In an aspect, the communication link may be a frequency channel between the DSDS UE and the base station.

In an aspect, the method may further include transmitting, using one of either the first subscription or the second subscriptions, first control information associated with the first subscription and a first subscription identifier and second control information associated with the second subscription and a second subscription identifier.

In an aspect, the first control information and the second control information may be first DCI and second DCI, respectively, where transmitting the first control information and the second control information may include transmitting a PDCCH with the first subscription identifier for the first DCI and with the second subscription identifier for the second DCI. In an aspect, the first subscription identifier may be a first C-RNTI and the second subscription identifier may be a second C-RNTI.

In an aspect, the method may further include changing the first connection for the first subscription by switching from the first frequency resource on a first communication link to a second frequency resource on a second communication link for the first connection.

In an aspect, the method may further include transmitting, using the first subscription, first control information associated with the first subscription based on a first subscription identifier on a first communication link via the first frequency resource.

In an aspect, the second control information associated with the second subscription may be transmitted based on a second subscription identifier on a second communication link via the second frequency resource.

In an aspect, the communication with the DSDS UE may be performed based on the first control information and for the second control information.

In an aspect, performing the communication may include: receiving uplink communication based on at least one of the first control information or the second control information respectively associated with the at least one of the first subscription or the second subscription if the at least one of the first control information or the second control information includes an uplink scheduling grant, and performing downlink communication based on the at least one of the first control information or the second control information respectively associated with the at least one of the first subscription or the second subscription if the at least one of the first control information or the second control information includes a downlink scheduling assignment. In an aspect, the uplink communication may be PUSCH communication and the downlink communication may be PDSCH communication.

In another example, a base station for wireless communication is disclosed. The user equipment device includes at least one processor, a transceiver communicatively coupled to the at least one processor, and a memory communicatively coupled to the at least one processor. The at least one processor may be configured to establish a first connection through a communication link via a first subscription of a DSDS user equipment (UE) using a frequency resource, the DSDS UE being configured to communicate with at least two subscriptions, establish a second connection through the communication link via a second subscription of the DSDS UE using the frequency resource, and perform communication with the DSDS UE via at least one of the first subscription or the second subscription through the communication link using the frequency resource.

In another example, a non-transitory processor-readable storage medium having instructions for a base station thereon may be disclosed. The instructions, when executed by a processing circuit, cause the processing circuit to establish a first connection through a communication link via a first subscription of a DSDS user equipment (UE) using a frequency resource, the DSDS UE being configured to communicate with at least two subscriptions, establish a second connection through the communication link via a second subscription of the DSDS UE using the frequency resource, and perform communication with the DSDS UE via at least one of the first subscription or the second subscription through the communication link using the frequency resource.

In a further example, a base station for wireless communication may be disclosed. The base station includes means for establishing a first connection through a communication link via a first subscription of a DSDS user equipment (UE) using a frequency resource, the DSDS UE being configured to communicate with at least two subscriptions, means for establishing a second connection through the communication link via a second subscription of the DSDS UE using the frequency resource, and means for performing communication with the DSDS UE via at least one of the first subscription or the second subscription through the communication link using the frequency resource.

In one example, a method of wireless communication by a base station is disclosed. The method includes establishing a first connection via a first subscription of a DSDS user equipment (UE) and a second connection via a second subscription of the DSDS UE using a first frequency resource for the first and second subscriptions, the DSDS UE being configured to communicate with at least two subscriptions, changing the first connection for the first subscription by switching from the first frequency resource to a second frequency resource for the first connection, changing the second connection for a second subscription by switching from the first frequency resource to the second frequency resource for the second connection, in response to changing the first connection for the first subscription, and performing communication via at least one of the first subscription or the second subscription using the second frequency resource. In an aspect, the first connection and the second connection may be established with the base station using a same RAT.

In an aspect, the method may further include transmitting, to the DSDS UE, one or more reference signals for a mobility measurement via the first subscription using the first frequency resource.

In an aspect, changing the first connection for the first subscription is based on the mobility measurement.

In an aspect, the method may further include after changing the first connection and prior to changing the second connection, performing first communication via the first subscription using the second frequency resource and performing second communication via the second subscription using the first frequency resource.

In an aspect, the method may further include after changing the first connection and prior to changing the second connection, receiving an indication for the second frequency resource as a target frequency resource.

In an aspect, changing the second connection may be based on the indication.

In another example, a base station for wireless communication is disclosed. The user equipment device includes at least one processor, a transceiver communicatively coupled to the at least one processor, and a memory communicatively coupled to the at least one processor. The at least one processor may be configured to establish a first connection via a first subscription of a DSDS user equipment (UE) and a second connection via a second subscription of the DSDS UE using a first frequency resource for the first and second subscriptions, the DSDS UE being configured to communicate with at least two subscriptions, change the first connection for the first subscription by switching from the first frequency resource to a second frequency resource for the first connection, change the second connection for a second subscription by switching from the first frequency resource to the second frequency resource for the second connection, in response to changing the first connection for the first subscription, and perform communication via at least one of the first subscription or the second subscription using the second frequency resource.

In another example, a non-transitory processor-readable storage medium having instructions for a base station thereon may be disclosed. The instructions, when executed by a processing circuit, cause the processing circuit to establish a first connection via a first subscription of a DSDS user equipment (UE) and a second connection via a second subscription of the DSDS UE using a first frequency resource for the first and second subscriptions, the DSDS UE being configured to communicate with at least two subscriptions, change the first connection for the first subscription by switching from the first frequency resource to a second frequency resource for the first connection, change the second connection for a second subscription by switching from the first frequency resource to the second frequency resource for the second connection, in response to changing the first connection for the first subscription, and perform communication via at least one of the first subscription or the second subscription using the second frequency resource.

In a further example, a base station for wireless communication may be disclosed. The base station includes means for establishing a first connection via a first subscription of a DSDS user equipment (UE) and a second connection via a second subscription of the DSDS UE using a first frequency resource for the first and second subscriptions, the DSDS UE being configured to communicate with at least two subscriptions, means for changing the first connection for the first subscription by switching from the first frequency resource to a second frequency resource for the first connection, means for changing the second connection for a second subscription by switching from the first frequency resource to the second frequency resource for the second connection, in response to changing the first connection for the first subscription, and means for performing communication via at least one of the first subscription or the second subscription using the second frequency resource.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 6A is an example diagram illustrating a single stack case for two subscriptions having at least one protocol stack with the same RAT.

FIG. 6B is an example diagram illustrating a dual stack case for two subscriptions having at least one protocol stack with the same RAT.

DETAILED DESCRIPTION

Figure 1:
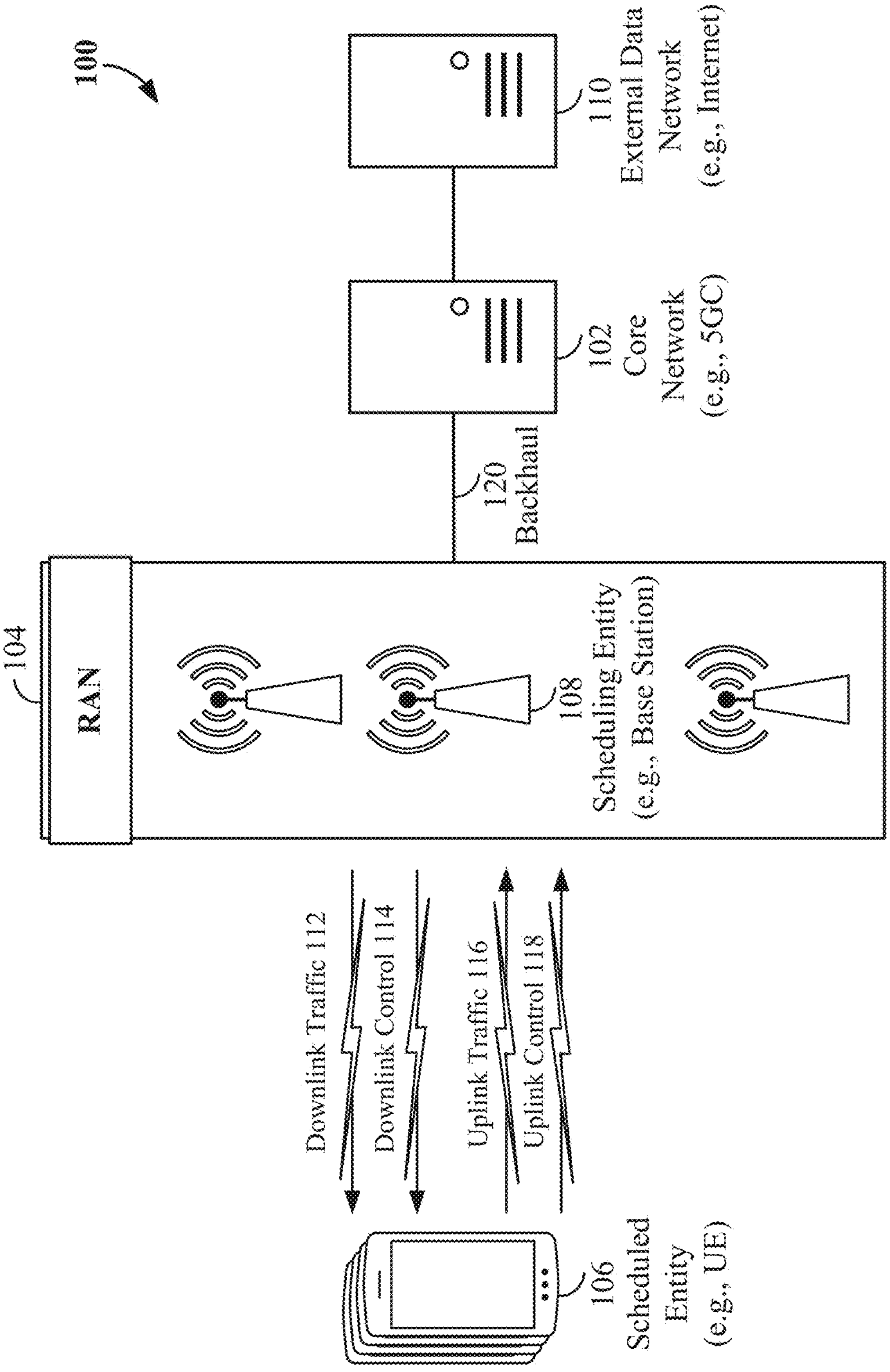
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

A user equipment (UE) with multiple subscriber identity modules (SIMs) having a dual SIM dual standby (DSDS) capability may operate multiple SIMS in an idle mode simultaneously to receive idle messages, but may not operate multiple SIMS an connected mode simultaneously to perform communication using multiple SIMS simultaneously. On the other hand, a UE with multiple SIMS having a dual SIM dual active (DSDA) capability may operate multiple SIMS in an idle mode and in a connected mode simultaneously. Because DSDS devices are generally less costly than DSDA devices and are widely used, there has been interest in improving operations by DSDS devices.

According to some aspects of the disclosure, when two subscriptions utilized by a DSDS device are both in the connected mode, the two subscriptions may camp on the same cell and/or utilize the same bandwidth parts, and establish connections using the same radio access technology (RAT) with the same base station. This may allow the DSDS device to utilize the two subscriptions to use the same frequency resource to perform transmission and reception simultaneously and/or communication in a TDD mode. Different approaches are introduced to utilize such an DSDS device. According to one approach, a DSDS UE may use the first subscription and the second subscription to connect to the same cell/base station using the same frequency though the same communication link. According to a second approach, in a DSDS UE, a primary subscription may perform mobility-related activities and other subscriptions may follow the results of the mobility related activities performed by the primary subscription.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3$^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
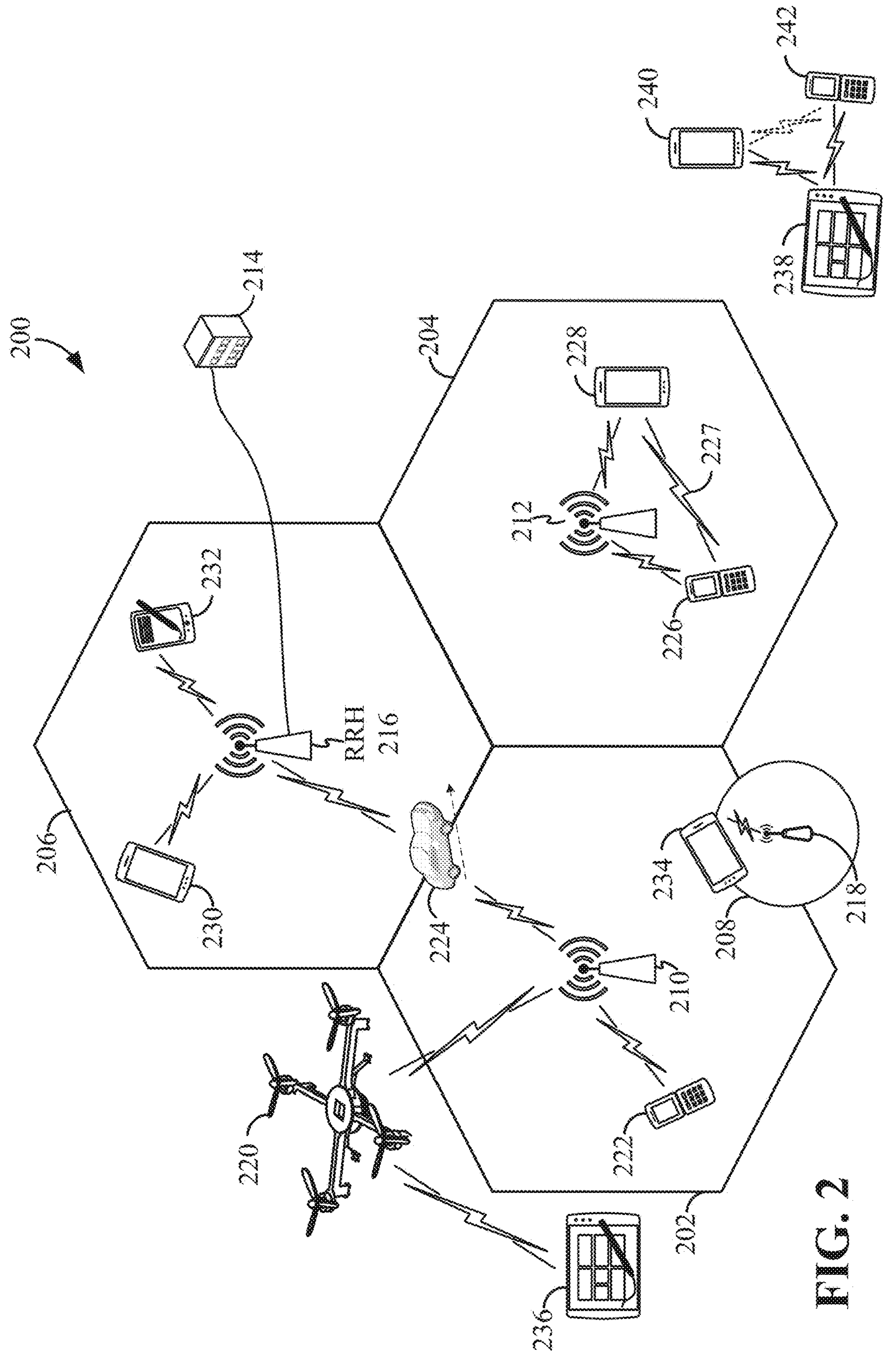
FIG. 2 is a conceptual illustration of an example of a radio access network according to some aspects.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time—frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
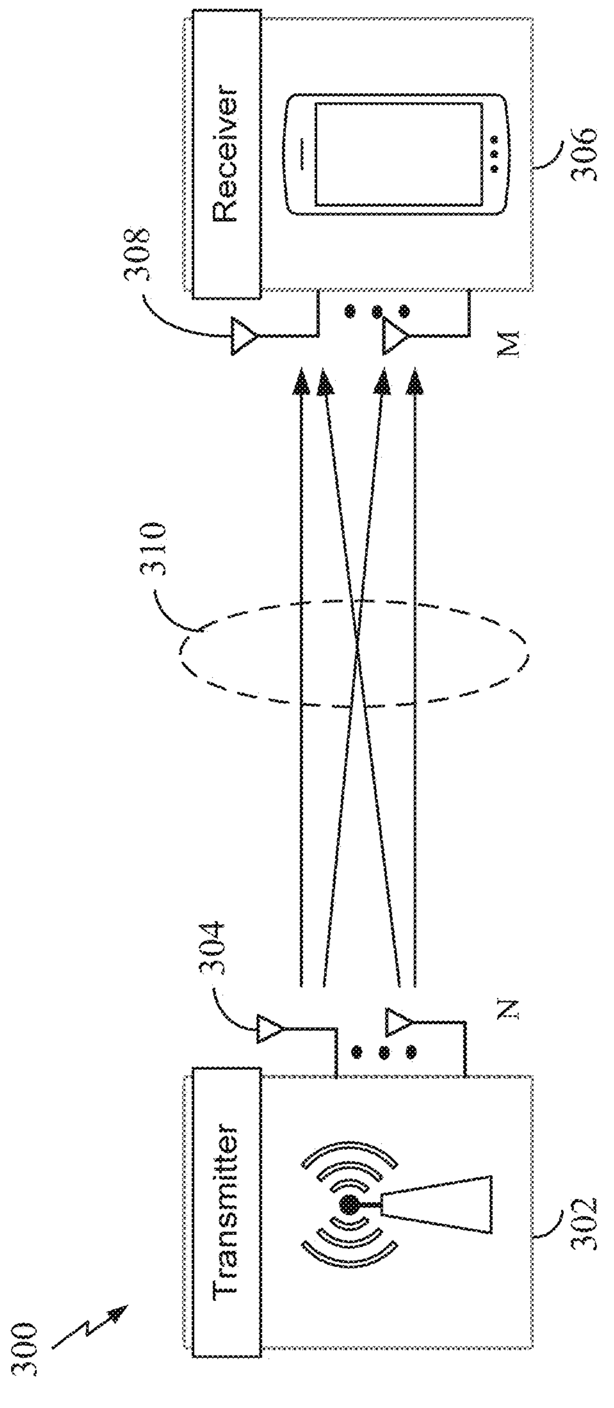
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

A UE may communicate with a service network using a subscription for a service (e.g., data service, voice service) provided by the service network. The UE may implement a subscription module such as a subscriber identity module (SIM) to connect to the service network. A UE may be configured to communicate using two or more subscriptions. For example, a UE implementing multiple SIMs respectively associated with multiple subscriptions may communicate using the multiple subscriptions via the multiple SIMS. The UE may establish communication links using the multiple subscriptions to perform communication using the multiple subscriptions. The communication links may be established with a common base station or different base stations.

Figure 4A:
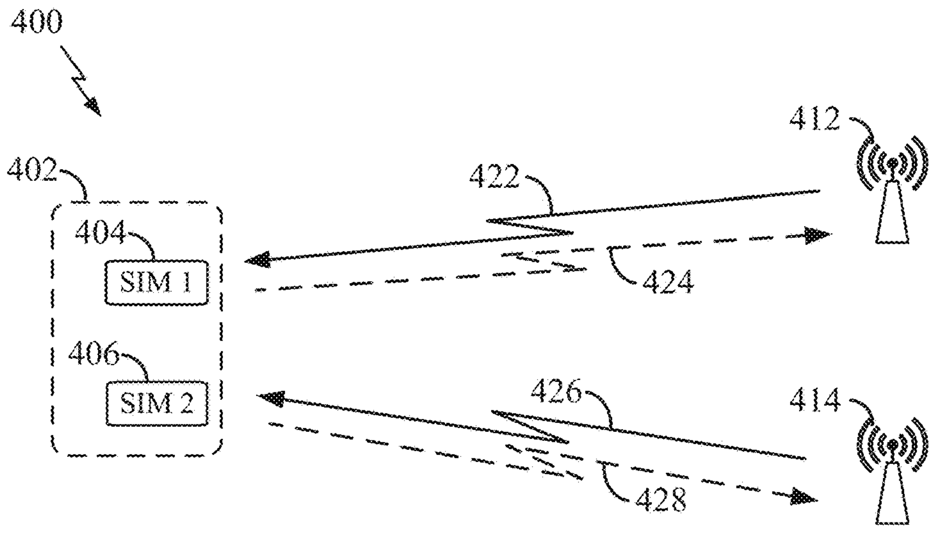
FIG. 4A is an example diagram illustrating communication between a DSDA UE and a base station.

In an example, for a UE with two SIMs having a dual SIM dual active (DSDA) capability, two SIMs may stay connected (e.g. in an active mode) simultaneously with a network and thus may be used to perform communication simultaneously. FIG. 4A is an example diagram 400 illustrating communication between a DSDA UE and a base station. In FIG. 4A, a DSDA UE 402 with the DSDA capability may include a first SIM 404 and a second SIM 406 that can be simultaneously in an idle mode and also can be simultaneously in an active mode. Further, in FIG. 4A, the first SIM 404 is used to connect to a first base station 412 and the second SIM 406 is used to connect to a second base station 414. Because the DSDA UE 402 has the DSDA capability, the DSDA UE 402 may use the first SIM 404 to receive communication 422 and/or to transmit communication 424 with the first base station 412 and may simultaneously use the second SIM 406 to receive communication 426 and/or transmit communication 428 with the second base station 414.

Figure 4B:
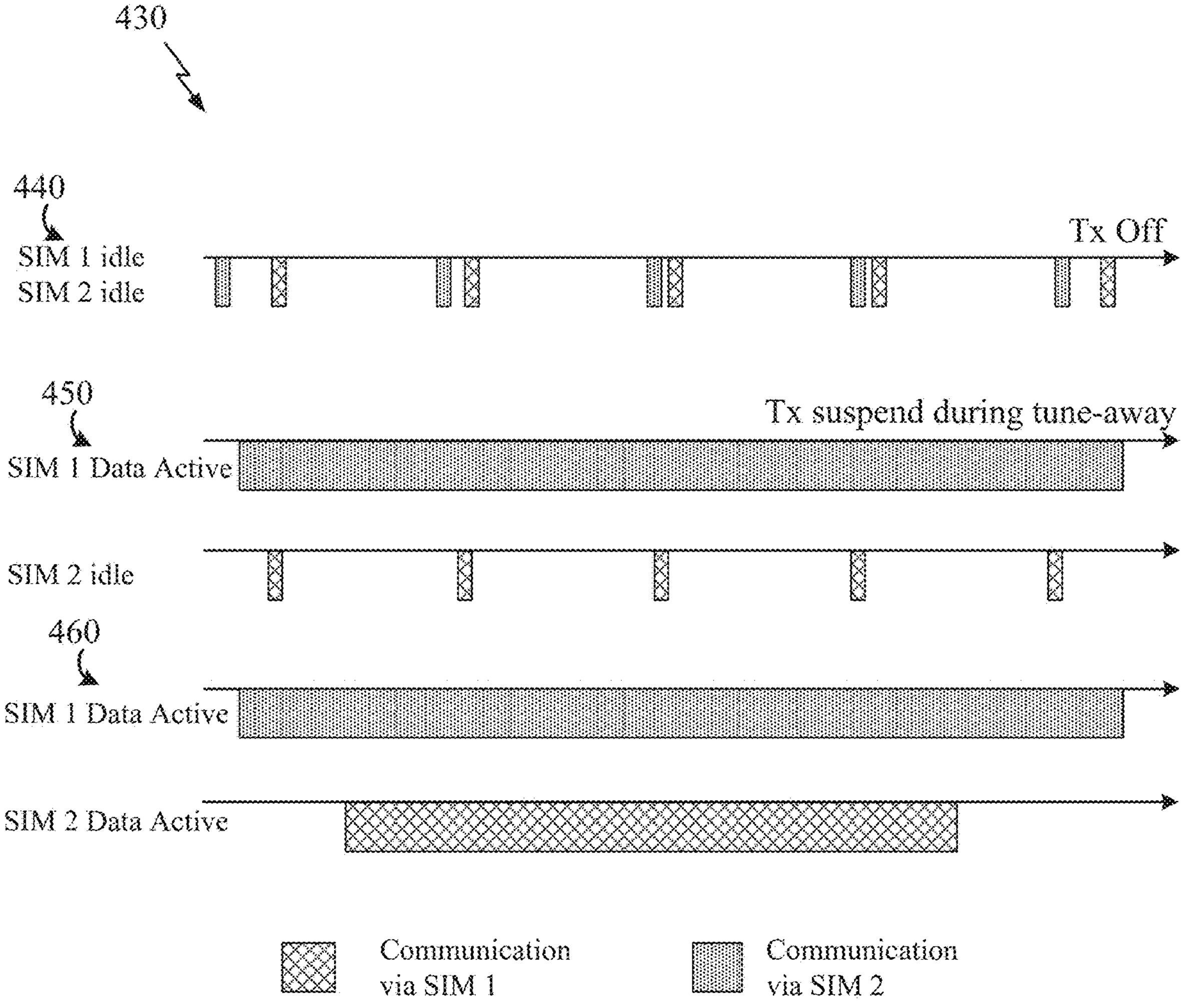
FIG. 4B is an example diagram illustrating time lines of various communications by two different SIMS of a DSDA UE.

FIG. 4B is an example diagram 430 illustrating time lines of various communications by two different SIMs of a DSDA UE. In a first diagram 440, a first SIM (e.g., first SIM 404) and a second SIM (e.g., second SIM 406) are in an idle mode, and no transmission is performed. As shown in the first diagram 440, the first SIM and the second SIM may be used to receive short idle mode messages such as paging messages. In a second diagram 450, the first SIM is in an active mode and thus transmits and/or receives communication for a certain duration, while the second SIM in an idle mode receives short idle mode messages. In a third diagram 460, the first SIM is in an active mode and thus transmits and/or receives diagram for a certain duration. Further, in the third diagram 460, the second SIM also transmits and/or receives diagram simultaneously for a certain duration, which may overlap with at least a part of the duration during which the first SIM receives data.

In another example, for a UE with two SIMS having a dual SIM dual standby (DSDS) capability, two SIMS may be in an idle mode simultaneously to receive idle messages, but may not be in an connected mode simultaneously. Hence, for a DSDS UE, while one SIM is used to actively perform communication, the other SIM may be placed on standby (e.g., idle mode). DSDS devices are generally less costly than DSDA devices because the DSDS devices generally include less hardware components than the DSDA devices. For example, DSDA devices generally have more antennas and other related RF components than DSDS devices. The DSDS device operation may vary depending on a type of communication. For example, if one SIM is used to perform data communication such as a data call and an internet communication, the other SIM may tune away to an idle mode. For example, if one SIM is used to perform voice communication that may have low delay tolerance, the other SIM may not perform any communication and may completely suspend an idle mode as well. At least two types of DSDS devices are currently available. A single receive (SR) DSDS device may receive communication via only one SIM at a time (e.g., via a single receive antenna). A dual receive (DR) DSDS device may receive communication via two SIMS simultaneously (e.g., via two receive antennas). However, regardless of whether a DSDS device is a SR DSDS device or a DR DSDS device, the DSDS device may transmit communication via only one SIM at a time (e.g., via a single transmit antenna).

Figure 5A:
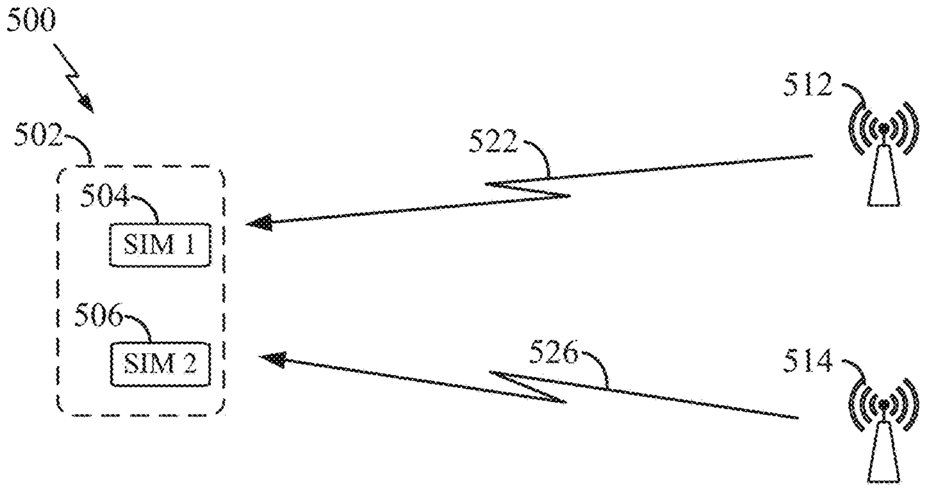
FIG. 5A is an example diagram illustrating communication between a DSDS UE and a base station.

FIG. 5A is an example diagram 500 illustrating communication between a DSDS UE and a base station. In FIG. 5A, a DSDS UE 502 with the DSDA capability may include a first SIM 504 and a second SIM 506 that can be simultaneously in an idle mode but cannot be simultaneously in an active mode. Further, in FIG. 5A, the first SIM 504 is used to connect to a first base station 512 and the second SIM 506 is used to connect to a second base station 514. As discussed above, the DSDS UE 502 may utilize the first SIM 504 and the second SIM 506 in an idle mode simultaneously, during which the first SIM 504 and the second SIM 506 may be used to receive idle mode messages (e.g., paging messages). However, the DSDS UE 502 may not be able to transmit communication via the first SIM 504 and communication via the second SIM 506 simultaneously. If the DSDS UE 502 is a DR DSDS device, the DSDS UE 502 may use the first SIM 504 to receive communication 522 with the first base station 512 and may simultaneously use the second SIM 506 to receive data communication 526 with the second base station 514. However, if the DSDS UE 502 is an SR DSDS device, the DSDS UE 602 may use only one of the first SIM 504 and the second SIM 506 at a time to receive communication.

Figure 5B:
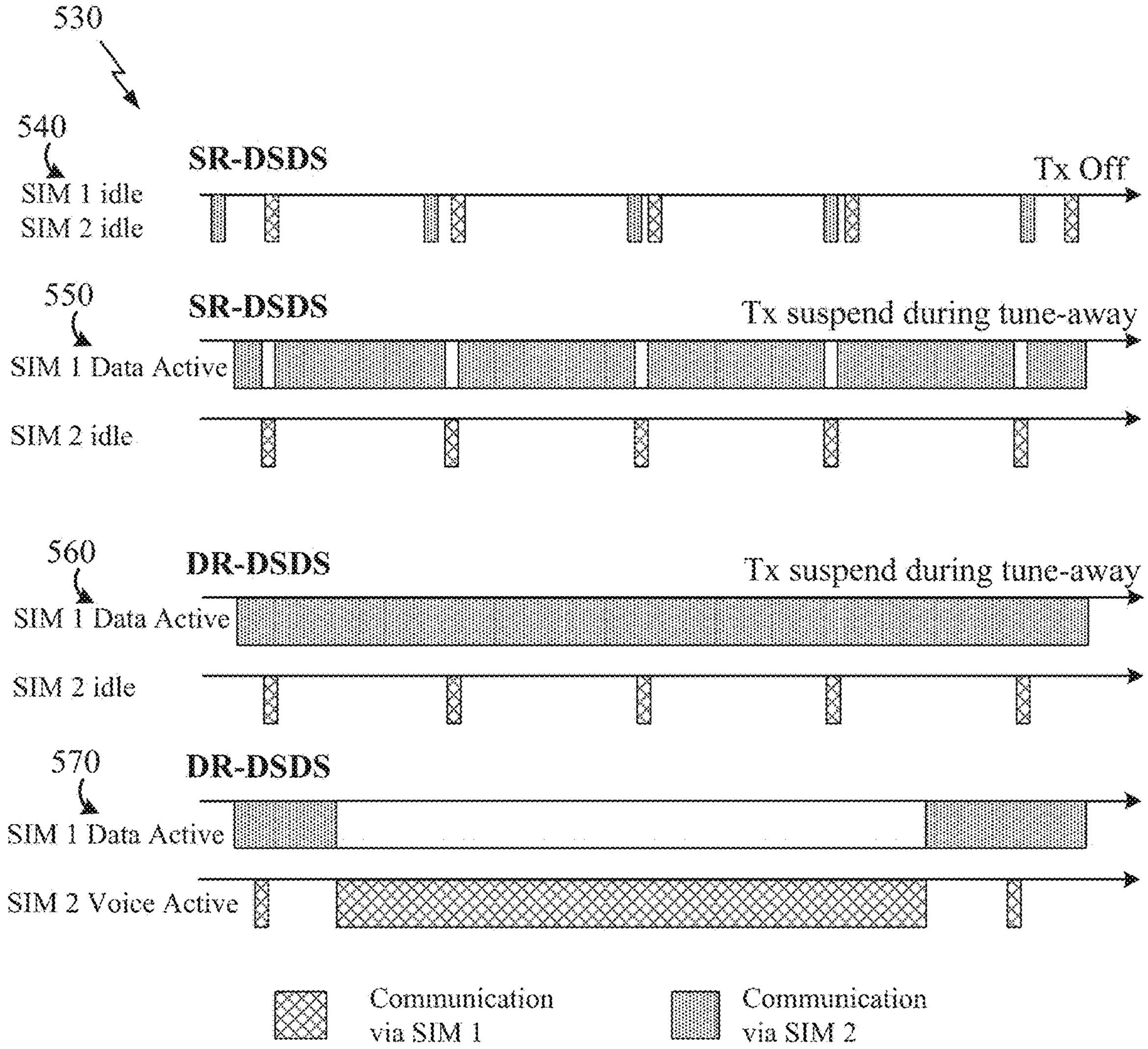
FIG. 5B is an example diagram illustrating time lines of various communications by two different SIMS of a DSDS UE.

FIG. 5B is an example diagram 530 illustrating time lines of various communications by two different SIMs of a DSDS UE. A first diagram 540 and a second diagram 550 illustrate communication by the two different SIMs of an SR DSDS UE. In the first diagram 540, a first SIM (e.g., first SIM 504) and a second SIM (e.g., second SIM 506) are in an idle mode, and no transmission is performed. As shown in the first diagram 540, the first SIM and the second SIM may be used to receive short idle mode messages such as paging messages. In the second diagram 550, the first SIM is in an active mode and thus transmits and/or receives data for a certain duration. Because the second diagram 550 shows communication by a DSDS device, when the second SIM in an idle mode receives short idle mode messages, the first SIM tunes away to allow the second SIM to receive the idle mode messages. A third diagram 560 and a fourth diagram 570 illustrate communication by the two different SIMs of an DR DSDS UE. In the third diagram 560, because a DR DSDS UE allows reception by the two different SIMs simultaneously, the first SIM may transmit and/or receive data communication without interruption while the second SIM in an idle mode receives idle mode messages. In the fourth diagram 570, the first SIM is used to perform data communication while the second SIM is used to perform voice communication. Because the voice communication is a high priority communication, the first SIM may completely tune away for a duration during which the second SIM is used to perform voice communication.

As discussed above, although a DSDA device may provide a certain advantage by allowing simultaneous communication by multiple SIMs, the DSDA device may require more RF components than a DSDS device and thus may be more costly than the DSDS device. Further, many users currently use DSDS devices. Because the DSDS devices are widely used and are generally lower in cost than DSDA devices, the DSDS devices remain popular. Therefore, there is an interest in improving communication by DSDS devices.

In some aspects of the disclosure, a DSDS device may be used to perform communication in a manner that a DSDA device performs. In particular, if two subscriptions (e.g., via two respective SIMS) camp on the same cell with the same radio access technology (RAT), one subscription may utilize one protocol stack to perform idle activities of the other subscription (e.g., page sharing). For example, when two subscriptions are both in the idle mode, one of the subscriptions may perform idle mode activities for both subscriptions. Further, when one subscription is in the idle mode and the other subscription is in the connected mode, the subscription in the connected mode may perform idle mode activities of the subscription in the idle mode. In addition, a dedicated resource (e.g., active resource for active use such as an active call) may be shared by both subscriptions when both subscriptions are in connected (active) mode while two subscriptions camp on the same cell with the same RAT.

To enable two subscriptions to camp on the same cell, the following conditions may be satisfied. One condition is that two subscriptions have at least one protocol stack with the same RAT. For example, in a single stack case, each of the first and second subscriptions may have a protocol stack for an NR technology, or an LTE technology, or a wideband code division multiple access (WCDMA) technology. FIG. 6A is an example diagram 600 illustrating a single stack case for two subscriptions having at least one protocol stack with the same RAT. As shown in FIG. 6A, each of the first and second subscriptions has a single protocol stack, and the protocol stack may be for an NR technology, an LTE technology, a WCDMA technology, or a GSM technology.

In another example, in a dual stack case, a first subscription may have protocol stacks for an NR technology and an LTE technology, while a second subscription may have protocol stacks for an NR technology and a WCDMA technology. In such an example of the dual stack case, if both subscriptions are camped on at least one cell with the same RAT, this condition may satisfy. Hence, if the first subscription is camped on a cell with the NR technology and the LTE technology, and the second subscription is camped on the same cell with the NR technology and the WCDMA technology, both the first and second subscriptions camp on the same cell utilizing the NR and thus the condition is satisfied. FIG. 6B is an example diagram 650 illustrating a dual stack case for two subscriptions having at least one protocol stack with the same RAT. As shown in FIG. 6B, each subscription may utilize one or two protocol stacks. In FIG. 6B, in one example, a first subscription may have a dual stack of MCG and SCG and a second subscription may have a dual stack of MCG and SCG. In another example, the first subscription may have a dual stack of the LTE technology and the NR technology while the second subscription has a dual stack of the LTE technology and the NR technology or a single stack of the LTE technology or a single stack of the NR technology. In another example, the first subscription may have a dual stack with both stacks utilizing the NR technology and the second subscription may have a dual stack with both stacks utilizing the NR technology or a single stack with the NR technology.

Another condition is that the two subscriptions should be able to camp on the same cell. For example, the subscriptions should belong to the same operator, or a RAN sharing cell is used by the subscriptions, or roaming on the same cell is available for the subscriptions.

In some aspects of the disclosure, when two subscriptions utilized by a DSDS device are both in the connected mode, the two subscriptions may camp on the same cell and establish connections using the same RAT with the same base station (e.g., by establishing connections with the same eNB or the same gNB). Therefore, the DSDS device may utilize the two subscriptions to use the same frequency resource to perform communication, which may include performing transmission and reception simultaneously and/or communication in a TDD mode. As such, features available for a DSDA device may be achieved using a DSDS device, which is less costly than DSDS devices.

In an aspect, one subscription may be utilized as a primary subscription while on or more other subscriptions are utilized as secondary subscriptions. The primary subscription may perform operations related to communication for the primary subscription as well as communication for the secondary subscription. In an aspect, a DSDS UE may determine a subscription as the primary subscription based on one or more factors discussed as follows. One factor is based on determining whether the subscription is set as a main data subscription. For example, a subscription using a data distribution service (DDS) may be a main data subscription and thus may be determined as the primary subscription. Another factor is based on determining which subscription has entered a connected mode first. For example, a subscription that has entered a connected mode first before other subscriptions may be determined as the primary subscription. Another factor is based on a current traffic type. For example, a subscription handling traffic with a highest priority among traffics handled by various subscriptions may be determined to be the priority subscription. For example, a voice communication may have a higher priority than data communication. For example, an ultra-reliable low-latency communication (URLLC) communication may have a higher priority than an enhanced mobile broadband (eMBB) communication. Any subscription in the DSDS UE that is not determined as the primary subscription may be determined as a secondary subscription.

In an aspect, in the DSDS UE with multiple subscriptions, when a first subscription is set as the primary subscription, a second subscription is set as a secondary subscription but may be set as the primary subscription temporarily if certain conditions are met, as discussed below. In an example, in a case where the first subscription that has been determined as the primary subscription enters an idle mode while the second subscription is in a connected mode, the DSDS UE may temporarily set the second subscription as the primary subscription and revert the first subscription back to being the primary subscription if the second subscription enters an idle mode and/or if the first subscription changes from the idle mode to a connected mode with no pending high priority communication (e.g., voice call) on the second subscription. In an example, in a case where both the first and second subscriptions are in a connected mode and the second subscription is performing a high priority communication (e.g., voice call), the DSDS UE may switch the second subscription to temporarily become the primary sub during the high priority communication by the second subscription and may revert the first subscription back to being the primary subscription after the high priority communication by the second subscription ends.

Figure 7:
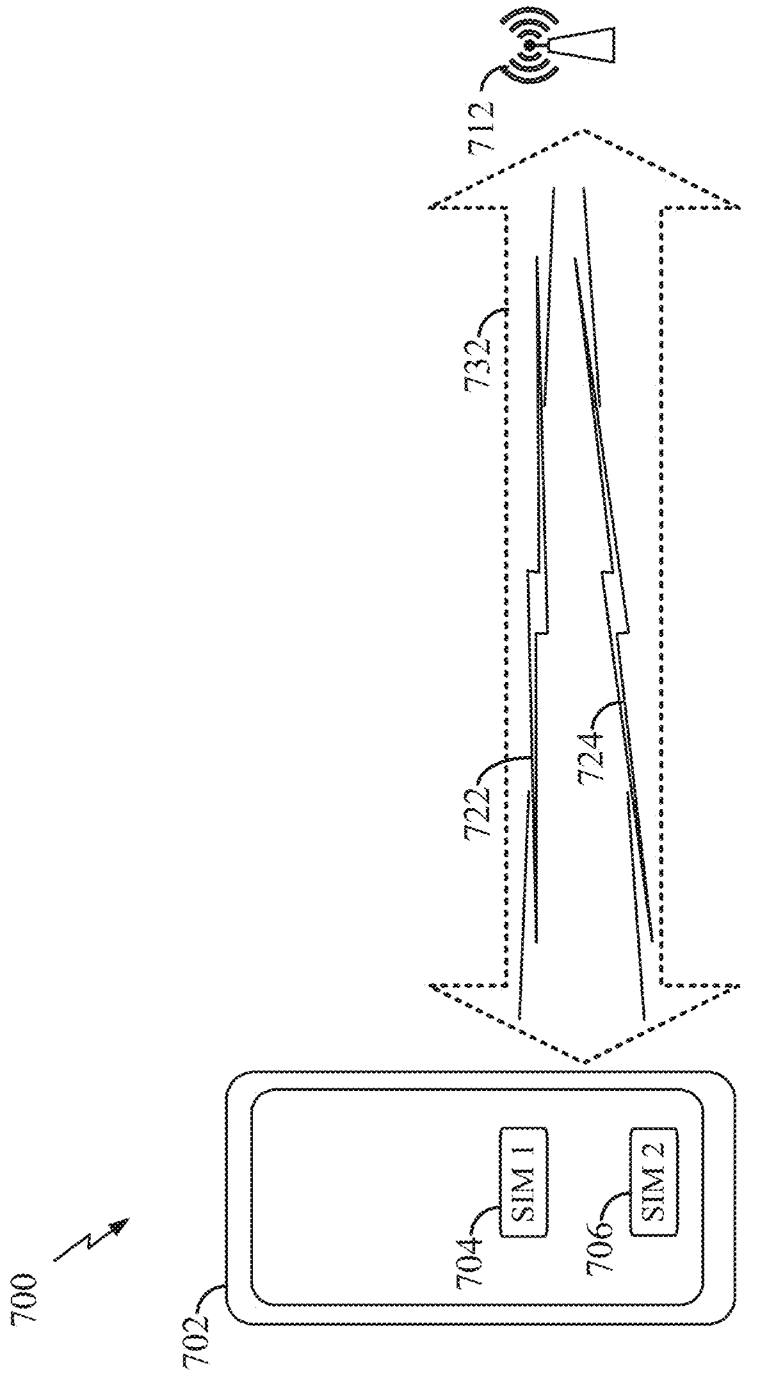
FIG. 7 is an example diagram illustrating connections between a UE and a base station via a single communication link using multiple subscriptions, according to an aspect of the disclosure.

FIG. 7 is an example diagram 700 illustrating connections between a UE and a base station via a single communication link using multiple subscriptions, according to an aspect of the disclosure. In FIG. 7, a UE 702 is a DSDS UE and includes two SIMS, a first SIM 704 associated with a first subscription and a second SIM 706 associated with a second subscription. For illustrative purposes, a dual SIM case with the first SIM 704 and the second SIM 706 is shown and explained. However, it is understood that the disclosure is not limited to a UE with two SIMS, and more than two SIMS for more than two subscriptions may be used, and/or multiple SIMS including the first SIM 704 and the second SIM 706 may be a part of a single component. In FIG. 7, the UE 702 may utilize the first SIM 704 to establish a first connection 722 with a base station 712 via the first subscription. The UE 702 may also utilize the second SIM 706 to establish a second connection 724 with the base station 712 via the second subscription. In an aspect, the first connection 722 and the second connection 724 may be established with the base station 712 utilizing the same RAT. In an aspect, the base station 712 may be an eNB or a gNB.

Either the first connection 722 or the second connection 724 may be established first. For example, if the first connection 722 is established first, the UE 702 may establish the first connection 722 by performing a RACH procedure and a first RRC setup procedure with the base station 712 using the first SIM 704 associated with the first subscription, and then may establish the second connection 724 by performing a second RRC setup procedure with the base station 712 using the second SIM 706 associated with the second subscription. In this example, when establishing the second connection 724, a RACH procedure may not be performed, at least because the communication link 732 is common for both the first and second subscriptions and the RACH procedure is already performed when establishing the first connection 722 using the first SIM 704.

At least two approaches may be implemented according to various aspects of the disclosure, as discussed below. The approaches discussed below may not be mutually exclusive and thus may be combined. According to a first approach, the UE (e.g., DSDS UE) may use the first subscription and the second subscription to connect to the same cell/base station using the same frequency resource (e.g., by using the same physical resource block) though the same communication link. The communication link may be a frequency channel established between the UE and a base station. As such, the UE may communicate with the base station via the first subscription and/or second subscription through the same communication link and using the same frequency source. In this situation, the first and second subscriptions may camp on the same cell with the same RAT. If the first and second subscriptions are used to connect to the same cell/base station using the same frequency resource and through the same communication link, the UE may use one of the first and second subscriptions to monitor for first control information (e.g., first DCI) associated with the first subscription based on a first subscription identifier and also to monitor for second control information (e.g., second DCI) associated with the second subscription. In an aspect, the one of the first and second subscriptions used to monitor for the first and second control information may be a primary subscription, while the other subscription may be a secondary subscription. The first subscription identifier may be a first cell radio network temporary identifier (C-RNTI) and the second subscription identifier is a second C-RNTI. Hence, each of the first subscription and the second subscription utilizes its own subscription identifier. In an aspect, the UE may use the one of the first and second subscriptions to monitor for the first DCI and the second DCI by monitoring a physical downlink control channel (PDCCH) for the first DCI and the second DCI. Hence, for example, the UE may use one of the subscriptions to monitor a PDCCH with different C-RNTIs for different subscriptions to retrieve DCIs based on the different C-RNTIs.

On the other hand, if the UE (e.g., DSDS UE) uses the first subscription and the second subscription to establish connections using different frequency resources (e.g., by using different physical resource blocks) though different communication links, the first subscription may be used to monitor for the first control information (e.g., first DCI) associated with the first subscription while the second subscription may be used to monitor for the second control information (e.g., second DCI) associated with the second subscription. Thus, in this situation, different subscriptions are used to monitor for their respective control information.

In the example shown in FIG. 7, according to the first approach, the first connection 722 via the first SIM 704 and the second connection 724 via the second SIM 706 may be established with the base station 712 on a communication link 732. Hence, the connections via the first SIM 704 and the second SIM 706 with the base station 712 are established on the same communication link, which is the communication link 732.

According to a second approach, in a UE (e.g., DSDS UE), a primary subscription may perform mobility-related activities and other subscriptions may follow the results of the mobility related activities performed by the primary subscription. In an aspect, in a case where a primary subscription and a secondary subscription utilize a first frequency resource, if the UE determines to change a first connection using the primary subscription from the first frequency resource to a second frequency resource, the UE may also determine to change a second connection using the secondary subscription from the first frequency resource to the second frequency resource, so as to follow the determination associated with the first subscription. For example, the first frequency resource may be a first cell and/or a first BWP and the second frequency resource may be a second cell and/or a second BWP, and if the UE determines to change a first connection using the primary subscription from the first cell and/or the first BWP to the second cell and/or the second BWP, the UE may also determine to change a second connection using the secondary subscription from the first cell and/or the first BWP to the second cell and/or the second BWP. When determining to change the first connection for the first subscription, the UE may perform a mobility measurement via the first subscription using the first frequency source, and then determine whether to change the first connection for the first subscription based on mobility measurement. For example, the mobility measurement may be based on signal strength measurements of different frequency resources. In an example, the UE may make signal strength measurements of reference signals associated with different frequency resources (e.g., different cells/base stations or different BWPs), such as reference signal received power (RSRP) or reference signal received quality (RSRQ) measurements, based on reference signals associated with different cells/base stations or different BWPs.

Figure 8A:
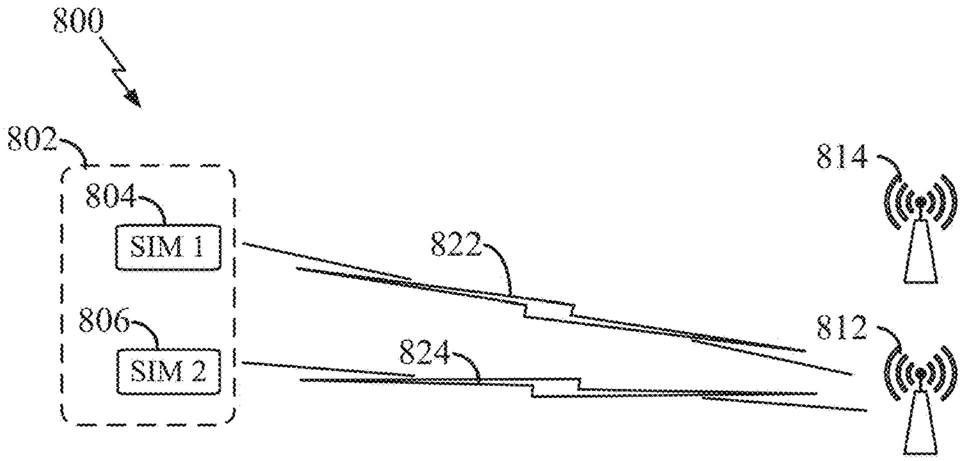
FIG. 8A is an example diagram illustrating the UE with connections to a first base station via two subscriptions, according to some aspects of the disclosure.
Figure 8B:
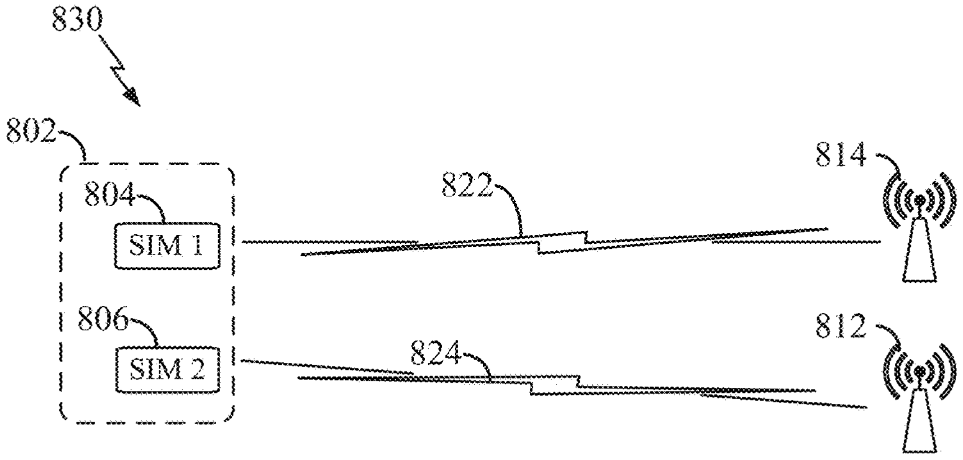
FIG. 8B is an example diagram illustrating the UE with connections to a second base station via two subscriptions, according to some aspects of the disclosure.
Figure 8C:
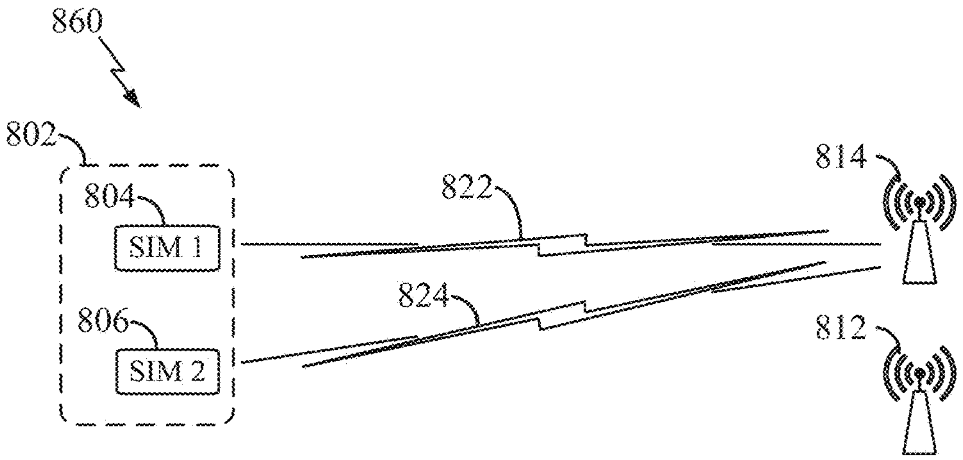
FIG. 8C is an example diagram illustrating the UE with connections to a second base station via two subscriptions, according to some aspects of the disclosure.

FIGS. 8A-8C are example diagrams illustrating changes in connections between a UE and one or more base stations using multiple subscriptions, according to an aspect of the disclosure. In FIGS. 8A-8C, a UE 802 is a DSDS UE and includes two SIMs, a first SIM 804 associated with a first subscription and a second SIM 806 associated with a second subscription. For illustrative purposes, a dual SIM case with the first SIM 804 and the second SIM 806 is shown and explained. However, it is understood that the disclosure is not limited to a UE with two SIMS, and more than two SIMS for more than two subscriptions may be used, and/or multiple SIMS including the first SIM 804 and the second SIM 806 may be a part of a single component. In FIGS. 8A-8C, the UE 802 may utilize the first SIM 804 and the second SIM 806 to establish connections with one or more of the first base station 812 and the second base station 814. In an aspect, a first connection 822 established using the first SIM 804 and a second connection 824 established using the second SIM 806 may utilize the same RAT. In an aspect, the first base station 812 may be associated with a first cell and the second base station 814 may be associated with a second cell different from the first cell.

FIG. 8A is an example diagram 800 illustrating the UE with connections to a first base station via two subscriptions, according to some aspects of the disclosure. In FIG. 8A, the UE 802 may establish the first connection 822 with the first base station 812 via the first SIM 704 and may establish the second connection 824 with the first base station 812 via the second SIM 806. When both the first SIM 804 and the second SIM 806 are connected to the same base station, both the first connection 822 and the second connection 824 may utilize a first frequency resource. Optionally, as discussed above, the first connection 822 and the second connection 824 may be established through the same communication link. In an aspect, the UE 802 in FIG. 8A may later determine to change the first connection 822 for the first SIM 804 by switching from the first base station 812 to the second base station 814 for the first connection 822. This determination to change the first connection 822 may be based on mobility measurements such as signal strengths measurements with the first base station 812 and the second base station 814 using the first connection 822.

FIG. 8B is an example diagram 830 illustrating the UE with connections to a second base station via two subscriptions, according to some aspects of the disclosure. In FIG. 8B, after the UE determining to change the first connection 822 as discussed above, the UE 802 has changed the first connection 822 for the first SIM 804 by performing a handover from the first base station 812 (e.g., using the first frequency resource) to the second base station 814 (e.g., using the second frequency resource). In FIG. 8B, the UE 802 has not yet changed the second connection 824 for the second SIM 806 to follow the change in the first connection 822 via the first SIM 804. Hence, in FIG. 8B. the UE 802 has the second connection 824 with the first base station 812 via the second SIM 806 to communicate with the first base station 812, while having the first connection 822 with the second base station 814 via the first SIM 804 to communicate with the second base station 814. In an aspect, the UE 802 in FIG. 8B may determine to change the second connection 824 for the second SIM 806 by switching from the first base station 812 to the second base station 814 for the second connection 824. This determination to change the second connection 824 may be based on the change in the first connection 822 to switch to the second base station 814.

FIG. 8C is an example diagram 860 illustrating the UE with connections to a second base station via two subscriptions, according to some aspects of the disclosure. In FIG. 8C, after the UE determining to change the second connection 824 as discussed above, the UE 802 has changed the second connection 824 for the second SIM 806 by performing a handover from the first base station 812 (e.g., using the first frequency resource) to the second base station 814 (e.g., using the second frequency resource). Hence, in FIG. 8C, the UE 802 has the second connection 824 with the second base station 814 via the second SIM 806 to communicate with the second base station 814, while having the first connection 822 also with the second base station 814 via the first SIM 804 to communicate with the second base station 814. Therefore, in FIG. 8C, both the first SIM 804 and the second SIM 806 are connected to the same base station, and both the first connection 822 and the second connection 824 may utilize the second frequency resource to communicate with the second base station 814.

In an aspect, referring back to FIG. 8A, the first connection 822 may be changed to utilize a different frequency resource with or without changing to another base station. For example, while staying on the same base station, e.g., first base station 812, the UE 802 may determine to change the first connection 822 for the first SIM 804 by switching from a first BWP to a second BWP for the first connection 822. This determination to change the first connection 822 may be based on mobility measurements such as signal strengths measurements associated with the first BWP and the second BWP using the first connection 822. When the UE 802 has changed the first connection 822 for the first SIM 804 by switching from the first BWP to the second BWP, the UE 802 may determine to change the second connection 824 for the second SIM 806 by switching from the first BWP to the second BWP, based on the changing the first connection 822. During a time period after switching the first connection 822 to the second BWP but before switching the second connection 824 to the second BWP, the first connection 822 for the first SIM 804 may utilize the second BWP while the second connection 824 for the second SIM 806 may utilize the first BWP. After changing the second connection 824 to switch to the second BWP, both the first SIM 804 and the second SIM 806 may utilize the second BWP to communicate with the first base station 812.

Figure 9:
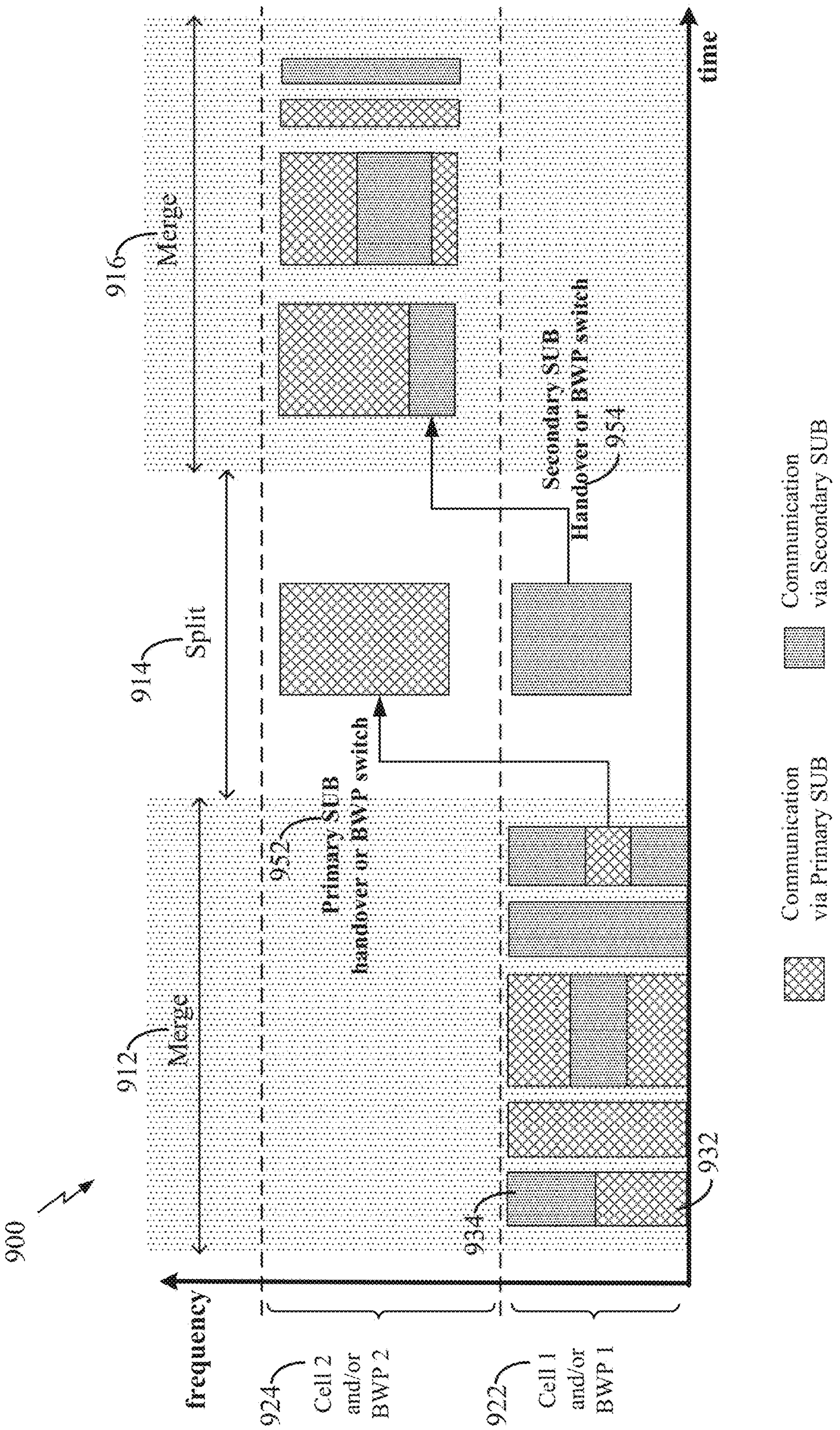
FIG. 9 is an example diagram illustrating different subscriptions switching frequency resources, according to some aspects of the disclosure.

FIG. 9 is an example diagram 900 illustrating different subscriptions switching frequency resources, according to some aspects of the disclosure. During a first time period 912, the UE may enter a merge mode, where the UE may have a first connection with a base station via a first subscription and a second connection with the base station via a second subscription using a first frequency resource 922 for the first and second subscriptions. The first frequency resource 922 may be associated with a first cell and/or a first BWP. In this example, the first subscription may be a primary subscription and the second subscription may be a secondary subscription. During the first time period 912, the first subscription may perform channel monitoring 932 and the second subscription may perform channel monitoring 934. Further, throughout the first time period 912, the first subscription and the second subscription may be used to communicate using the first frequency resource 922, where the first subscription and the second subscription are used one at a time, both at a time, or in a TDD mode.

At 952, the UE may change the first connection for the first subscription by switching to a second frequency resource 924. In such a case, during the second time period 914, the UE may enter a split mode, where the UE may have the first connection for the first subscription using the second frequency resource 924 for communication, while the UE may have the second connection for the second subscription continuing to use the first frequency resource 922 for communication. For example, the second frequency resource 924 may be associated with a second cell and/or a second BWP, and thus the first connection may be switched to use the second frequency resource by performing a handover from the first cell to the second cell and/or by switching from the first BWP to the second BWP.

At 954, the UE may change the second connection for the second subscription by switching to the second frequency resource 924. In such a case, during the third time period 916, the UE may enter a merge mode, where the UE may have the first connection for the first subscription using the second frequency resource 924 for communication, while also having the second connection for the second subscription using the second frequency resource 924 for communication. For example, the second connection may be switched to use the second frequency resource by performing a handover from the first cell to the second cell and/or by switching from the first BWP to the second BWP. Throughout the third time period 916, the first subscription and the second subscription may be used to communicate using the second frequency resource 924, where the first subscription and the second subscription are used one at a time, both at a time, or in a TDD mode In an aspect, the secondary subscription may follow the results of the mobility related activities performed by the primary subscription without network awareness. For example, in response to the change in the first connection of the first subscription to switch from a first frequency resource to a second frequency resource, the UE may change the second connection of the second subscription to switch from the first frequency resource to the second frequency resource without communicating to a network about changing the second connection to switch to the second frequency resource.

In another aspect, the secondary subscription may follow the results of the mobility related activities performed by the primary subscription with a network assistance. For example, in response to the change in the first connection of the first subscription to switch from a first frequency resource to a second frequency resource, the UE may transmit an indication indicating a target frequency resource to a network (e.g., base station connected to the UE using the second subscription). For example, the indication may indicate a cell identifier to indicate a target cell or a BWP identifier to indicate a target BWP, as the target frequency resource. If the indication indicates the second frequency resource as the target frequency resource, the base station may communicate with the UE to change the second connection to switch to the second frequency resource. In an aspect, the indication may be transmitted using UE assistance information transmitted to the base station. For example, the indication may be included in a nonCriticalExtension field in the UE assistance information. The UE may transmit the UE assistance information in response to an RRC reconfiguration message from the base station.

Figure 10:
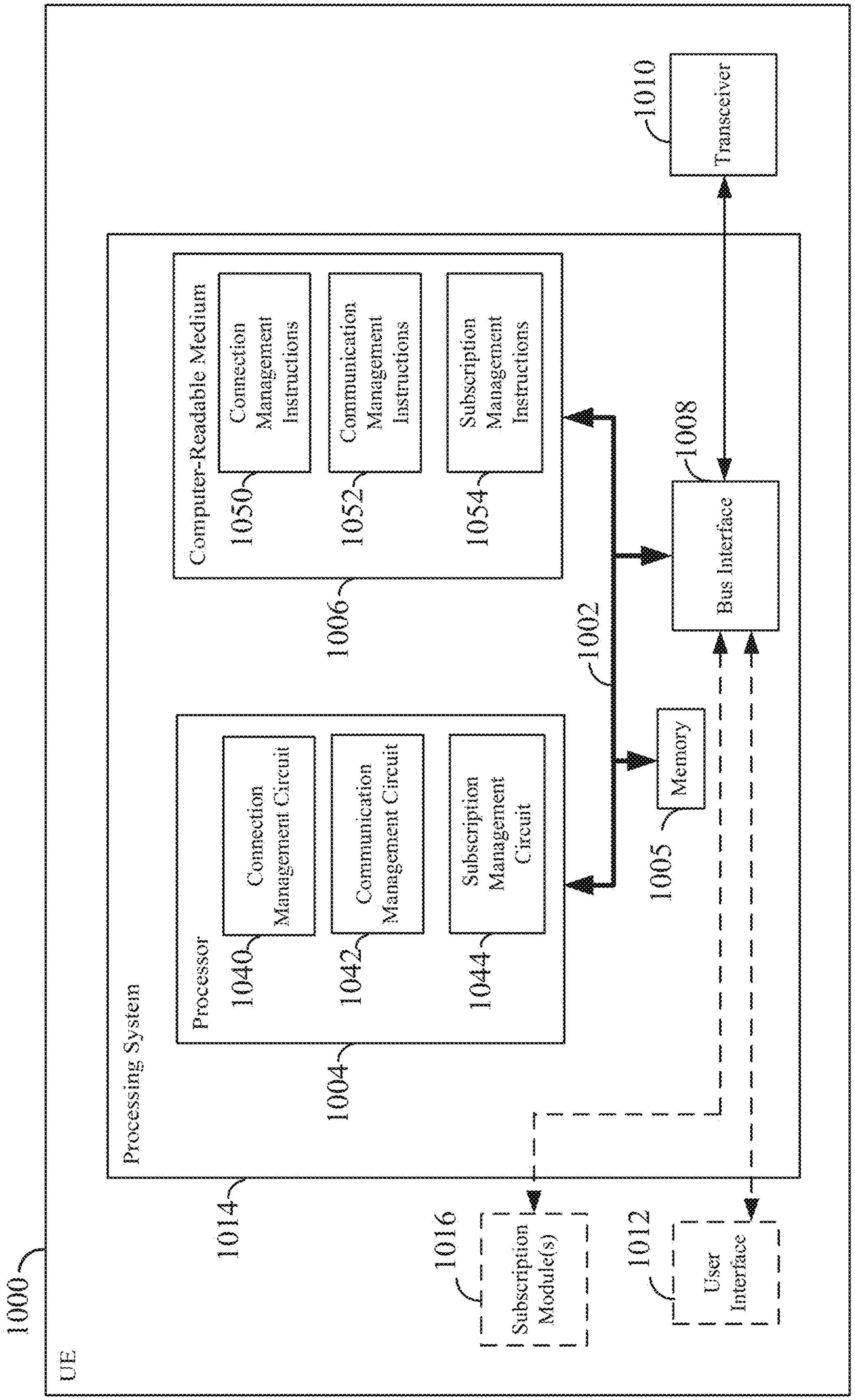
FIG. 10 is a block diagram conceptually illustrating an example of a hardware implementation for a user equipment according to some aspects of the disclosure.

FIG. 10 is a block diagram illustrating an example of a hardware implementation for a UE 1000 employing a processing system 1014. The UE 1000 may be a DSDS UE configured to communicate with at least two subscriptions. For example, the UE 1000 may be a UE as illustrated in any one or more of FIGS. 1, 2, 3, 7, and/or 8.

The UE 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1000 may be configured to perform any one or more of the functions described herein. That is, the processor 1004, as utilized in a UE 1000, may be used to implement any one or more of the processes and procedures described below and illustrated in FIGS. 11-14.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and processor-readable storage media (represented generally by the processor-readable storage medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a communication interface or means for communicating with various other apparatus over a transmission medium. In an aspect, the UE 1000 may include a subscription module 1016 that may be used to register with a service network. In such an aspect, the bus interface 1008 may provide an interface between the bus 1002, the transceiver 1010, and the subscription module 1016. In an aspect, the subscription module 1016 may enable the UE 1000 to use multiple subscriptions, such as a first subscription and a second subscription, to provide a service. The subscription module 1016 may include multiple subscription modules respectively for the multiple subscriptions. Depending upon the nature of the apparatus, a user interface 1012 (e.g., keypad, display, speaker, microphone, joystick) may also be provided. Of course, such a user interface 1012 is optional, and may be omitted in some examples, such as a base station.

In some aspects of the disclosure, the processor 1004 may include connection management circuitry 1040 configured for various functions, including, for example, establishing establish a first connection with a base station through a communication link via a first subscription using a frequency resource. For example, the connection management circuitry 1040 may be configured to implement one or more of the functions described below in relation to FIGS. 11-12, including, e.g., blocks 1102 and 1202.

In some aspects of the disclosure, the connection management circuitry 1040 may be configured for various functions, including, for example, establishing a second connection with the base station through the communication link via a second subscription using the frequency resource. For example, the connection management circuitry 1040 may be configured to implement one or more of the functions described below in relation to FIGS. 11-12, including, e.g., blocks 1104 and 1204.

In some aspects of the disclosure, the connection management circuitry 1040 may be configured for various functions, including, for example, changing the first connection for the first subscription by switching from the first frequency resource on a first communication link to a second frequency resource on a second communication link for the first connection. For example, the connection management circuitry 1040 may be configured to implement one or more of the functions described below in relation to FIG. 12, including, e.g., block 1258.

In some aspects of the disclosure, the connection management circuitry 1040 may be configured for various functions, including, for example, establishing a first connection with a base station via a first subscription and a second connection with the base station via a second subscription using a first frequency resource for the first and second subscription. For example, the connection management circuitry 1040 may be configured to implement one or more of the functions described below in relation to FIGS. 13-14, including, e.g., blocks 1302 and 1402.

In some aspects of the disclosure, the connection management circuitry 1040 may be configured for various functions, including, for example, changing the first connection for the first subscription by switching from the first frequency resource to a second frequency resource for the first connection. For example, the connection management circuitry 1040 may be configured to implement one or more of the functions described below in relation to FIGS. 13-14, including, e.g., blocks 1304 and 1456.

In some aspects of the disclosure, the connection management circuitry 1040 may be configured for various functions, including, for example, changing the second connection for a second subscription by switching from the first frequency resource to the second frequency resource for the second connection, in response to changing the first connection for the first subscription. For example, the connection management circuitry 1040 may be configured to implement one or more of the functions described below in relation to FIGS. 13-14, including, e.g., blocks 1306 and 1462.

In some aspects of the disclosure, the connection management circuitry 1040 may be configured for various functions, including, for example, performing a mobility measurement via the first subscription using the first frequency resource. For example, the connection management circuitry 1040 may be configured to implement one or more of the functions described below in relation to FIG. 14, including, e.g., block 1454.

In some aspects of the disclosure, the connection management circuitry 1040 may be configured for various functions, including, for example, after changing the first connection and prior to changing the second connection, performing first communication via the first subscription using the second frequency resource and performing second communication via the second subscription using the first frequency resource. For example, the connection management circuitry 1040 may be configured to implement one or more of the functions described below in relation to FIG. 14, including, e.g., block 1458.

In some aspects of the disclosure, the connection management circuitry 1040 may be configured for various functions, including, for example, after changing the first connection and prior to changing the second connection, transmitting, to the base station, an indication for the second frequency resource as a target frequency resource. For example, the connection management circuitry 1040 may be configured to implement one or more of the functions described below in relation to FIG. 14, including, e.g., block 1460.

In some aspects of the disclosure, the processor 1004 may include communication management circuitry 1042 configured for various functions, including, for example, performing communication with the base station via at least one of the first subscription or the second subscription through the communication link using the frequency resource. For example, the communication management circuitry 1042 may be configured to implement one or more of the functions described below in relation to FIGS. 11-12, including, e.g., blocks 1106 and 1256.

In some aspects of the disclosure, the communication management circuitry 1042 may be configured for various functions, including, for example, monitoring, using one of the first and second subscriptions, for first control information associated with the first subscription based on a first subscription identifier and for second control information associated with the second subscription based on a second subscription identifier. For example, the communication management circuitry 1042 may be configured to implement one or more of the functions described below in relation to FIG. 12, including, e.g., block 1254.

In some aspects of the disclosure, the communication management circuitry 1042 may be configured for various functions, including, for example, monitoring, using the first subscription, for first control information associated with the first subscription based on a first subscription identifier on a first communication link via the first frequency resource. For example, the communication management circuitry 1042 may be configured to implement one or more of the functions described below in relation to FIG. 12, including, e.g., block 1260.

In some aspects of the disclosure, the communication management circuitry 1042 may be configured for various functions, including, for example, performing communication via at least one of the first subscription or the second subscription using the second frequency resource. For example, the communication management circuitry 1042 may be configured to implement one or more of the functions described below in relation to FIGS. 13-14, including, e.g., blocks 1308 and 1464.

In some aspects of the disclosure, the communication management circuitry 1042 may be configured for various functions, including, for example, monitoring, using the second subscription, for second control information associated with the second subscription based on a second subscription identifier on a second communication link via the second frequency resource. For example, the communication management circuitry 1042 may be configured to implement one or more of the functions described below in relation to FIG. 12, including, e.g., block 1262.

In some aspects of the disclosure, the processor 1004 may include subscription management circuitry 1044 configured for various functions, including, for example, determining that the one of the first and second subscriptions is a primary subscription based on one or more of following: determining whether one or more of the first and second subscriptions is a main data subscription, determining which of the first and second subscriptions has entered a connected mode first, determining which of the first and second subscriptions has entered an idle mode, and determining a type of first data communicated via the first subscription and a type of second data communicated via the second subscription. For example, the subscription management circuitry 1044 may be configured to implement one or more of the functions described below in relation to FIG. 12, including, e.g., block 1206.

In some aspects of the disclosure, the subscription management circuitry 1044 may be configured for various functions, including, for example, changing the primary subscription to be the other one of the first and second subscriptions in response to determining that the one of the first and second subscriptions has entered an idle mode and the other one of the first and second subscriptions is in a connected mode. For example, the subscription management circuitry 1044 may be configured to implement one or more of the functions described below in relation to FIG. 12, including, e.g., block 1208.

In some aspects of the disclosure, the subscription management circuitry 1044 may be configured for various functions, including, for example, changing the primary subscription back to be the one of the first and second subscriptions in response to determining that the one of the first and second subscriptions has entered a connected mode. For example, the subscription management circuitry 1044 may be configured to implement one or more of the functions described below in relation to FIG. 12, including, e.g., block 1210.

In some aspects of the disclosure, the subscription management circuitry 1044 may be configured for various functions, including, for example, determining that the one of the first and second subscriptions is a primary subscription based on one or more of following: determining whether one or more of the first and second subscriptions is a main data subscription, determining which of the first and second subscriptions has entered a connected mode first, determining which of the first and second subscriptions has entered an idle mode, and determining a type of first data communicated via the first subscription and a type of second data communicated via the second subscription. For example, the subscription management circuitry 1044 may be configured to implement one or more of the functions described below in relation to FIG. 14, including, e.g., block 1404.

In some aspects of the disclosure, the subscription management circuitry 1044 may be configured for various functions, including, for example, changing the primary subscription to be the second subscription in response to determining that the first subscription has entered an idle mode and the second subscription is in a connected mode. For example, the subscription management circuitry 1044 may be configured to implement one or more of the functions described below in relation to FIG. 14, including, e.g., block 1406.

In some aspects of the disclosure, the subscription management circuitry 1044 may be configured for various functions, including, for example, changing the primary subscription back to be the first subscriptions in response to determining that the first subscriptions has entered a connected mode. For example, the subscription management circuitry 1044 may be configured to implement one or more of the functions described below in relation to FIG. 14, including, e.g., block 1408.

The processor 1004 is responsible for managing the bus 1002 and general processing, including the execution of software stored on the processor-readable storage medium 1006. The software, when executed by the processor 1004, causes the processing system 1014 to perform the various functions described below for any particular apparatus. The processor-readable storage medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium 1006. The processor-readable storage medium 1006 may be a non-transitory processor-readable storage medium. A non-transitory processor-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The processor-readable storage medium 1006 may reside in the processing system 1014, external to the processing system 1014, or distributed across multiple entities including the processing system 1014. The processor-readable storage medium 1006 may be embodied in a computer program product. By way of example, a computer program product may include a processor-readable storage medium in packaging materials. Those skilled in the art will recognize how best to implement the described functionality presented throughout this disclosure depending on the particular application and the overall design constraints imposed on the overall system.

In some aspects of the disclosure, the processor-readable storage medium 1006 may include connection management software/instructions 1050 configured for various functions, including, for example, establishing establish a first connection with a base station through a communication link via a first subscription using a frequency resource. For example, the connection management software/instructions 1050 may be configured to implement one or more of the functions described below in relation to FIGS. 11-12, including, e.g., blocks 1102 and 1202.

In some aspects of the disclosure, the connection management software/instructions 1050 may be configured for various functions, including, for example, establishing a second connection with the base station through the communication link via a second subscription using the frequency resource. For example, the connection management software/instructions 1050 may be configured to implement one or more of the functions described below in relation to FIGS. 11-12, including, e.g., blocks 1104 and 1204.

In some aspects of the disclosure, the connection management software/instructions 1050 may be configured for various functions, including, for example, changing the first connection for the first subscription by switching from the first frequency resource on a first communication link to a second frequency resource on a second communication link for the first connection. For example, the connection management software/instructions 1050 may be configured to implement one or more of the functions described below in relation to FIG. 12, including, e.g., block 1258.

In some aspects of the disclosure, the connection management software/instructions 1050 may be configured for various functions, including, for example, establishing a first connection with a base station via a first subscription and a second connection with the base station via a second subscription using a first frequency resource for the first and second subscription. For example, the connection management software/instructions 1050 may be configured to implement one or more of the functions described below in relation to FIGS. 13-14, including, e.g., blocks 1302 and 1402.

In some aspects of the disclosure, the connection management software/instructions 1050 may be configured for various functions, including, for example, changing the first connection for the first subscription by switching from the first frequency resource to a second frequency resource for the first connection. For example, the connection management software/instructions 1050 may be configured to implement one or more of the functions described below in relation to FIGS. 13-14, including, e.g., blocks 1304 and 1456.

In some aspects of the disclosure, the connection management software/instructions 1050 may be configured for various functions, including, for example, changing the second connection for a second subscription by switching from the first frequency resource to the second frequency resource for the second connection, in response to changing the first connection for the first subscription. For example, the connection management software/instructions 1050 may be configured to implement one or more of the functions described below in relation to FIGS. 13-14, including, e.g., blocks 1306 and 1462.

In some aspects of the disclosure, the connection management software/instructions 1050 may be configured for various functions, including, for example, performing a mobility measurement via the first subscription using the first frequency resource. For example, the connection management software/instructions 1050 may be configured to implement one or more of the functions described below in relation to FIG. 14, including, e.g., block 1454.

In some aspects of the disclosure, the connection management software/instructions 1050 may be configured for various functions, including, for example, after changing the first connection and prior to changing the second connection, performing first communication via the first subscription using the second frequency resource and performing second communication via the second subscription using the first frequency resource. For example, the connection management software/instructions 1050 may be configured to implement one or more of the functions described below in relation to FIG. 14, including, e.g., block 1458.

In some aspects of the disclosure, the connection management software/instructions 1050 may be configured for various functions, including, for example, after changing the first connection and prior to changing the second connection, transmitting, to the base station, an indication for the second frequency resource as a target frequency resource. For example, the connection management software/instructions 1050 may be configured to implement one or more of the functions described below in relation to FIG. 14, including, e.g., block 1460.

In some aspects of the disclosure, the processor-readable storage medium 1006 may include communication management software/instructions 1052 configured for various functions, including, for example, performing communication with the base station via at least one of the first subscription or the second subscription through the communication link using the frequency resource. For example, the communication management software/instructions 1052 may be configured to implement one or more of the functions described below in relation to FIGS. 11-12, including, e.g., blocks 1106 and 1256.

In some aspects of the disclosure, the communication management software/instructions 1052 may be configured for various functions, including, for example, monitoring, using one of the first and second subscriptions, for first control information associated with the first subscription based on a first subscription identifier and for second control information associated with the second subscription based on a second subscription identifier. For example, the communication management software/instructions 1052 may be configured to implement one or more of the functions described below in relation to FIG. 12, including, e.g., block 1254.

In some aspects of the disclosure, the communication management software/instructions 1052 may be configured for various functions, including, for example, monitoring, using the first subscription, for first control information associated with the first subscription based on a first subscription identifier on a first communication link via the first frequency resource. For example, the communication management software/instructions 1052 may be configured to implement one or more of the functions described below in relation to FIG. 12, including, e.g., block 1260.

In some aspects of the disclosure, the communication management software/instructions 1052 may be configured for various functions, including, for example, performing communication via at least one of the first subscription or the second subscription using the second frequency resource. For example, the communication management software/instructions 1052 may be configured to implement one or more of the functions described below in relation to FIGS. 13-14, including, e.g., blocks 1308 and 1464.

In some aspects of the disclosure, the communication management software/instructions 1052 may be configured for various functions, including, for example, monitoring, using the second subscription, for second control information associated with the second subscription based on a second subscription identifier on a second communication link via the second frequency resource. For example, the communication management software/instructions 1052 may be configured to implement one or more of the functions described below in relation to FIG. 12, including, e.g., block 1262.

In some aspects of the disclosure, the processor-readable storage medium 1006 may include subscription management software/instructions 1054 configured for various functions, including, for example, determining that the one of the first and second subscriptions is a primary subscription based on one or more of following: determining whether one or more of the first and second subscriptions is a main data subscription, determining which of the first and second subscriptions has entered a connected mode first, determining which of the first and second subscriptions has entered an idle mode, and determining a type of first data communicated via the first subscription and a type of second data communicated via the second subscription. For example, the subscription management software/instructions 1054 may be configured to implement one or more of the functions described below in relation to FIG. 12, including, e.g., block 1206.

In some aspects of the disclosure, the subscription management software/instructions 1054 may be configured for various functions, including, for example, changing the primary subscription to be the other one of the first and second subscriptions in response to determining that the one of the first and second subscriptions has entered an idle mode and the other one of the first and second subscriptions is in a connected mode. For example, the subscription management software/instructions 1054 may be configured to implement one or more of the functions described below in relation to FIG. 12, including, e.g., block 1208.

In some aspects of the disclosure, the subscription management software/instructions 1054 may be configured for various functions, including, for example, changing the primary subscription back to be the one of the first and second subscriptions in response to determining that the one of the first and second subscriptions has entered a connected mode. For example, the subscription management software/instructions 1054 may be configured to implement one or more of the functions described below in relation to FIG. 12, including, e.g., block 1210.

In some aspects of the disclosure, the subscription management software/instructions 1054 may be configured for various functions, including, for example, determining that the one of the first and second subscriptions is a primary subscription based on one or more of following: determining whether one or more of the first and second subscriptions is a main data subscription, determining which of the first and second subscriptions has entered a connected mode first, determining which of the first and second subscriptions has entered an idle mode, and determining a type of first data communicated via the first subscription and a type of second data communicated via the second subscription. For example, the subscription management software/instructions 1054 may be configured to implement one or more of the functions described below in relation to FIG. 14, including, e.g., block 1404.

In some aspects of the disclosure, the subscription management software/instructions 1054 may be configured for various functions, including, for example, changing the primary subscription to be the second subscription in response to determining that the first subscription has entered an idle mode and the second subscription is in a connected mode. For example, the subscription management software/instructions 1054 may be configured to implement one or more of the functions described below in relation to FIG. 14, including, e.g., block 1406.

In some aspects of the disclosure, the subscription management software/instructions 1054 may be configured for various functions, including, for example, changing the primary subscription back to be the first subscriptions in response to determining that the first subscriptions has entered a connected mode. For example, the subscription management software/instructions 1054 may be configured to implement one or more of the functions described below in relation to FIG. 14, including, e.g., block 1408.

Figure 11:
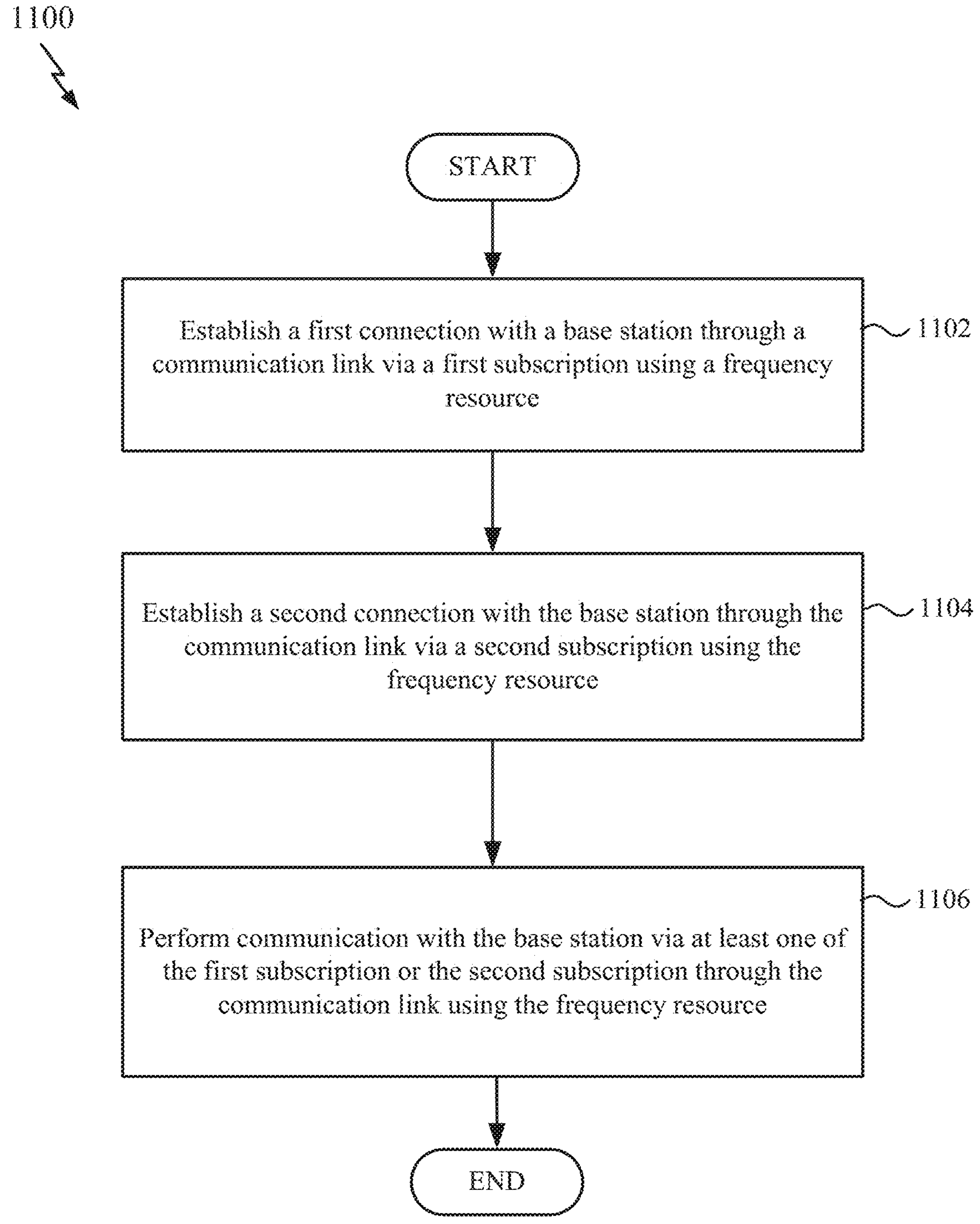
FIG. 11 is a flow chart illustrating an exemplary process for wireless communication by a user equipment, according to some aspects of the disclosure.

FIG. 11 is a flow chart illustrating an exemplary process 1100 for wireless communication by a UE, in accordance with some aspects of the present disclosure. As described below, some or all illustrated features may be omitted in a particular implementation within the scope of the present disclosure, and some illustrated features may not be required for implementation of all embodiments. In some examples, the process 1100 may be carried out by the UE 1000 illustrated in FIG. 10. In some examples, the process 1100 may be carried out by any suitable apparatus or means for carrying out the functions or algorithm described below.

At block 1102, the process 1100 includes establishing a first connection with a base station through a communication link via a first subscription using a frequency resource.

At block 1104, the process 1100 includes establishing a second connection with the base station through the communication link via a second subscription using the frequency resource.

At block 1106, the process 1100 includes performing communication with the base station via at least one of the first subscription or the second subscription through the communication link using the frequency resource.

In one configuration, the UE 1000 may include means for establishing a first connection with a base station through a communication link via a first subscription using a frequency resource, means for establishing a second connection with the base station through the communication link via a second subscription using the frequency resource, and means for performing communication with the base station via at least one of the first subscription or the second subscription through the communication link using the frequency resource. In one aspect, the aforementioned means may be the processor(s) 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the processor-readable storage medium 1006, or any other suitable apparatus or means described in any one of the FIGS. 1, 2, 3, 7, and/or 8, and utilizing, for example, the processes and/or algorithms described herein in relation to FIG. 11.

Figure 12A:
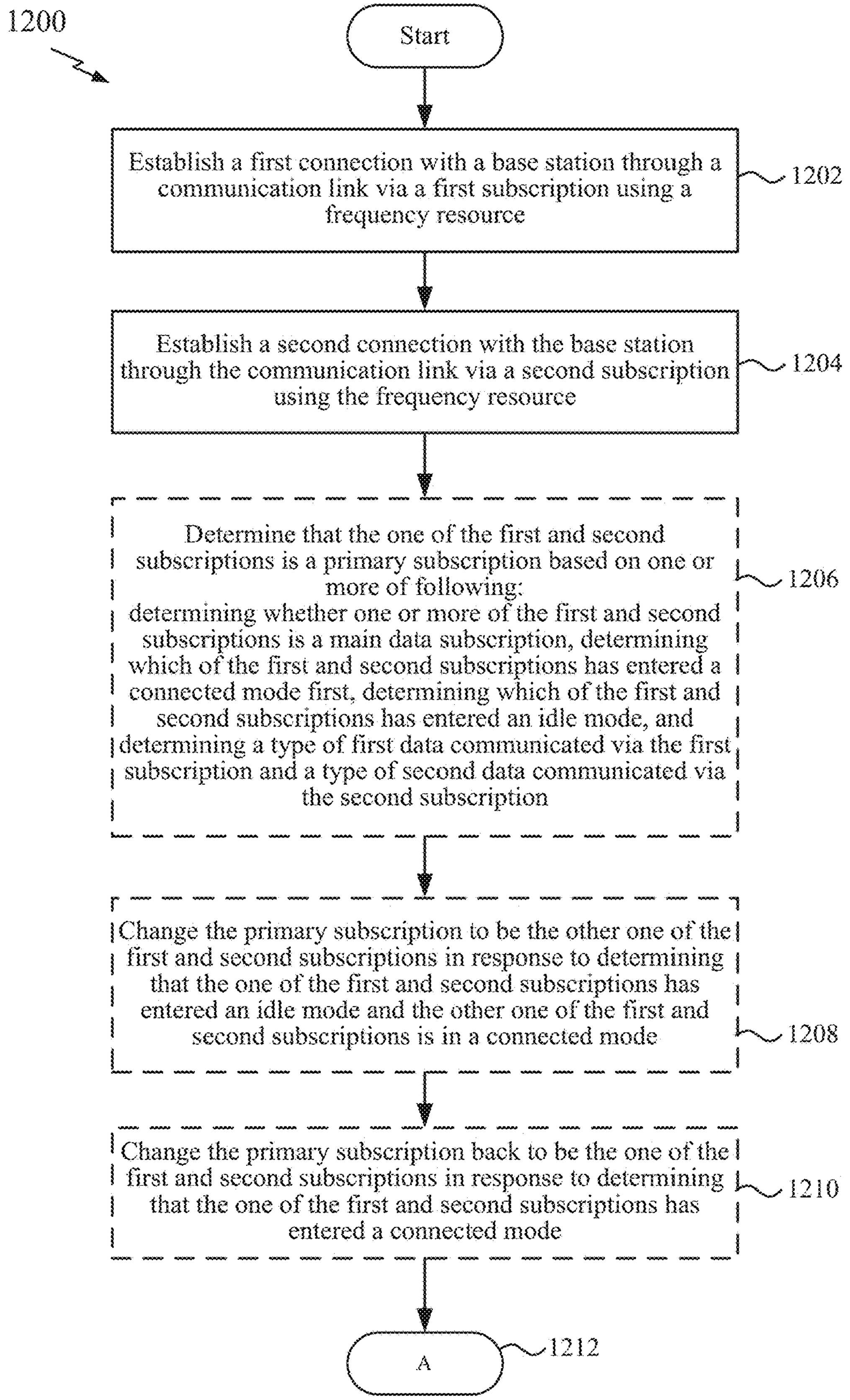
FIGS. 12A-12B are flow charts illustrating an exemplary process for wireless communication by a user equipment, according to some aspects of the disclosure.

FIG. 12A is a flow chart illustrating an exemplary process 1200 for wireless communication by a UE, in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the UE 1000 illustrated in FIG. 10. In some examples, the process 1200 may be carried out by any suitable apparatus or means for carrying out the functions or algorithm described below.

At block 1202, the process 1200 includes establishing a first connection with a base station through a communication link via a first subscription using a frequency resource.

At block 1204, the process 1200 includes establishing a second connection with the base station through the communication link via a second subscription using the frequency resource.

In an aspect, the first connection and the second connection may be established with the base station using a same RAT. In an aspect, the communication link may be a frequency channel between the DSDS UE and the base station.

At block 1206, the process 1200 may include determining that the one of the first and second subscriptions is a primary subscription based on one or more of following: determining whether one or more of the first and second subscriptions is a main data subscription, determining which of the first and second subscriptions has entered a connected mode first, determining which of the first and second subscriptions has entered an idle mode, and determining a type of first data communicated via the first subscription and a type of second data communicated via the second subscription.

In an aspect, the type of data communicated via the first subscription may indicate a first priority and the type of data communicated via the second subscription and a second priority, and the one of the first and second subscriptions may be determined as the primary subscription based on the first priority associated with the first data and the second priority associated with the second data.

At block 1208, the process 1200 may include changing the primary subscription to be the other one of the first and second subscriptions in response to determining that the one of the first and second subscriptions has entered an idle mode and the other one of the first and second subscriptions is in a connected mode.

At block 1210, the process 1200 may include changing the primary subscription back to be the one of the first and second subscriptions in response to determining that the one of the first and second subscriptions has entered a connected mode.

At block 1212, the process 1200 may include performing additional features shown in FIG. 12B below.

Figure 12B:
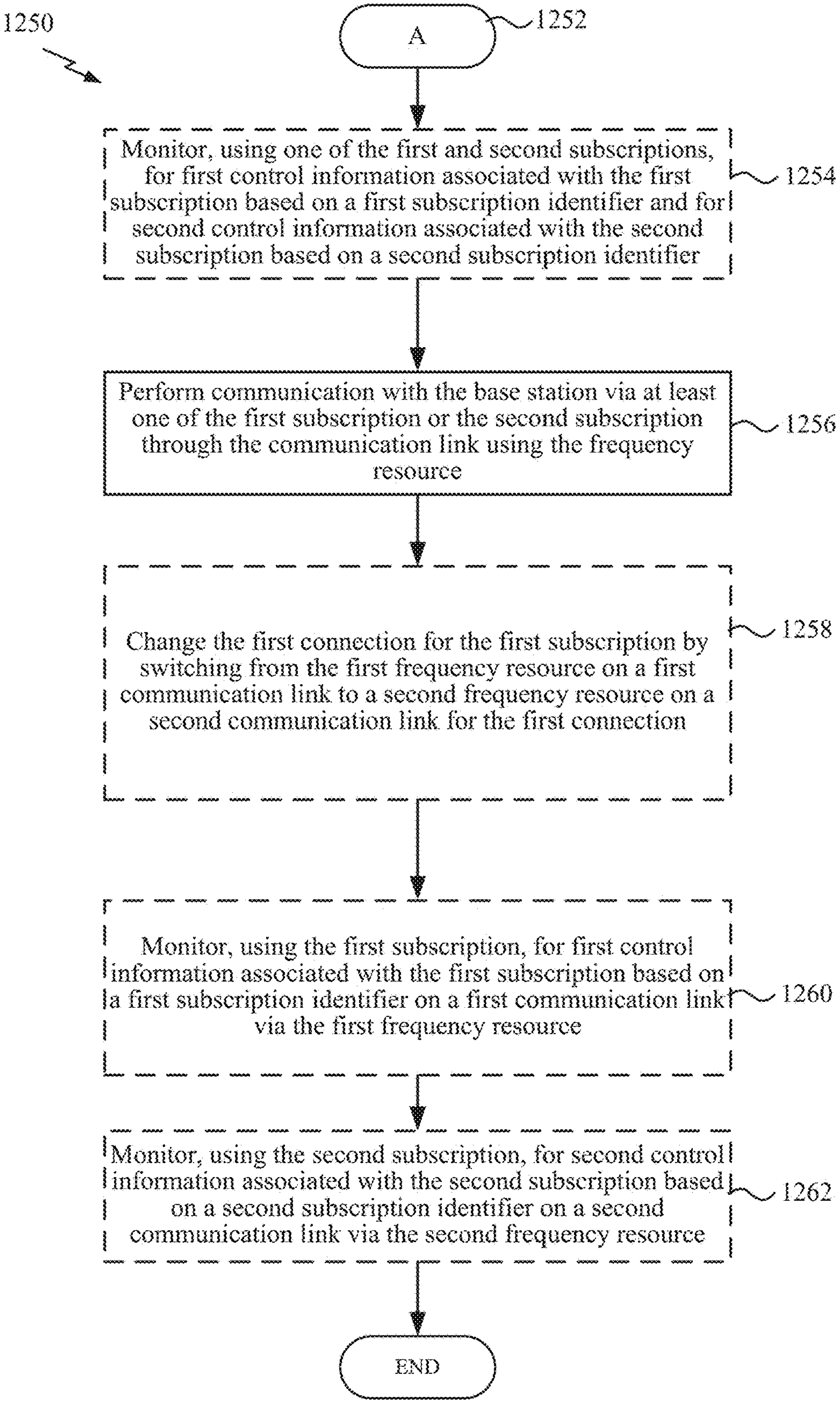

FIG. 12B is a flow chart illustrating an exemplary process 1250 for wireless communication by a UE, in accordance with some aspects of the present disclosure. As described below, some or all illustrated features may be omitted in a particular implementation within the scope of the present disclosure, and some illustrated features may not be required for implementation of all embodiments. In some examples, the process 1200 may be carried out by the UE 1000 illustrated in FIG. 10. In some examples, the process 1200 may be carried out by any suitable apparatus or means for carrying out the functions or algorithm described below. At block 1252, the process 1250 may continue from block 1212 of FIG. 12A.

At block 1254, the process 1250 may include monitoring, using one of the first and second subscriptions, for first control information associated with the first subscription based on a first subscription identifier and for second control information associated with the second subscription based on a second subscription identifier.

In an aspect, the one of the first and second subscriptions may be used for monitoring for the first control information and the second information in response to determining that the one of the first and second subscriptions is the primary subscription at block 1206.

In an aspect, the first control information and the second control information may be first DCI and second DCI, respectively, where monitoring for the first control information and for the second control information may include monitoring a PDCCH with the first subscription identifier for the first DCI and with the second subscription identifier for the second DCI. In an aspect, the first subscription identifier may be a first C-RNTI and the second subscription identifier is a second C-RNTI.

At block 1256, the process 1250 includes performing communication with the base station via at least one of the first subscription or the second subscription through the communication link using the frequency resource.

In an aspect, performing the communication may include performing uplink communication based on at least one of the first control information or the second control information respectively associated with the at least one of the first subscription or the second subscription if the at least one of the first control information or the second control information includes an uplink scheduling grant, and receiving downlink communication based on the at least one of the first control information or the second control information respectively associated with the at least one of the first subscription or the second subscription if the at least one of the first control information or the second control information includes a downlink scheduling assignment. In an aspect, the uplink communication may be PUSCH communication and the downlink communication may be PDSCH communication.

In an aspect, performing communication with the base station may include receiving simultaneously first downlink communication via the first subscription and second downlink communication via the second subscription through the communication link using the frequency resource.

In an aspect, the communication with the base station may be performed based on monitoring for the first control information and for the second control information at block 1254.

At block 1258, the process 1250 may include changing the first connection for the first subscription by switching from the first frequency resource on a first communication link to a second frequency resource on a second communication link for the first connection. At block 1260, the process 1250 may include monitoring, using the first subscription, for first control information associated with the first subscription based on a first subscription identifier on a first communication link via the first frequency resource. At block 1262, the process 1250 may include monitoring, using the second subscription, for second control information associated with the second subscription based on a second subscription identifier on a second communication link via the second frequency resource.

In one configuration, the UE 1000 may include means for establishing a first connection with a base station through a communication link via a first subscription using a frequency resource, means for establishing a second connection with the base station through the communication link via a second subscription using the frequency resource, and means for performing communication with the base station via at least one of the first subscription or the second subscription through the communication link using the frequency resource.

The UE 1000 may further include means for monitoring, using one of the first and second subscriptions, for first control information associated with the first subscription based on a first subscription identifier and for second control information associated with the second subscription based on a second subscription identifier, means for changing the first connection for the first subscription by switching from the first frequency resource on a first communication link to a second frequency resource on a second communication link for the first connection, means for monitoring, using the first subscription, for first control information associated with the first subscription based on a first subscription identifier on a first communication link via the first frequency resource, means for monitoring, using the second subscription, for second control information associated with the second subscription based on a second subscription identifier on a second communication link via the second frequency resource, means for determining that the one of the first and second subscriptions is a primary subscription based on one or more of following: determining whether one or more of the first and second subscriptions is a main data subscription, determining which of the first and second subscriptions has entered a connected mode first, determining which of the first and second subscriptions has entered an idle mode, and determining a type of first data communicated via the first subscription and a type of second data communicated via the second subscription, means for changing the primary subscription to be the other one of the first and second subscriptions in response to determining that the one of the first and second subscriptions has entered an idle mode and the other one of the first and second subscriptions is in a connected mode, and means for changing the primary subscription back to be the one of the first and second subscriptions in response to determining that the one of the first and second subscriptions has entered a connected mode.

In one aspect, the aforementioned means may be the processor(s) 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the processor-readable storage medium 1006, or any other suitable apparatus or means described in any one of the FIGS. 1, 2, 3, 7, and/or 8, and utilizing, for example, the processes and/or algorithms described herein in relation to FIG. 12.

Figure 13:
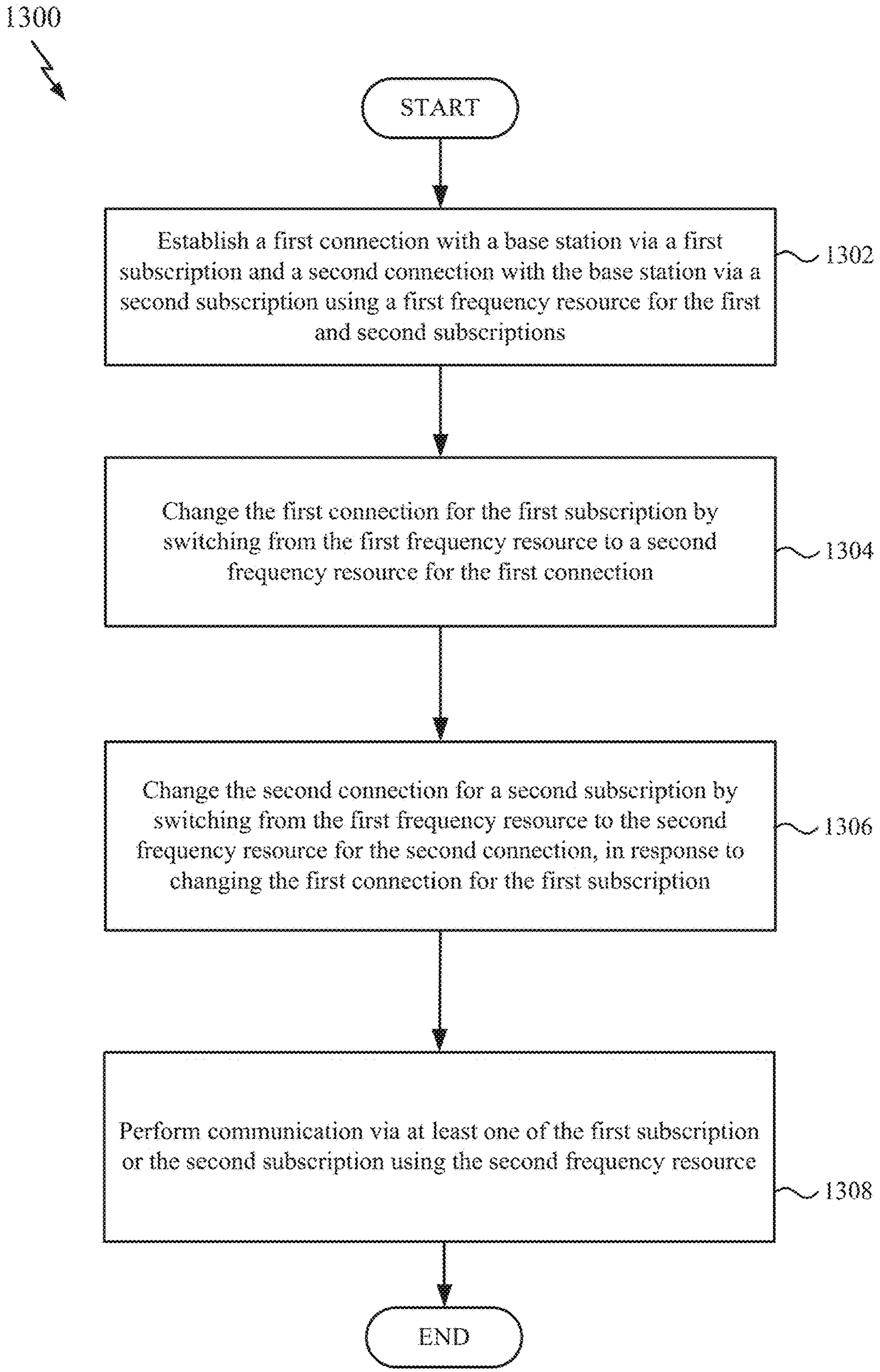
FIG. 13 is a flow chart illustrating an exemplary process for wireless communication by a user equipment, according to some aspects of the disclosure.

FIG. 13 is a flow chart illustrating an exemplary process 1300 for wireless communication by a UE, in accordance with some aspects of the present disclosure. As described below, some or all illustrated features may be omitted in a particular implementation within the scope of the present disclosure, and some illustrated features may not be required for implementation of all embodiments. In some examples, the process 1300 may be carried out by the UE 1000 illustrated in FIG. 10. In some examples, the process 1300 may be carried out by any suitable apparatus or means for carrying out the functions or algorithm described below.

At block 1302, the process 1300 includes establishing a first connection with a base station via a first subscription and a second connection with the base station via a second subscription using a first frequency resource for the first and second subscriptions.

At block 1304, the process 1300 includes changing the first connection for the first subscription by switching from the first frequency resource to a second frequency resource for the first connection.

At block 1306, the process 1300 includes changing the second connection for a second subscription by switching from the first frequency resource to the second frequency resource for the second connection, in response to changing the first connection for the first subscription.

At block 1308, the process 1300 includes performing communication via at least one of the first subscription or the second subscription using the second frequency resource.

In one configuration, the UE 1000 may include means for establishing a first connection with a base station via a first subscription and a second connection with the base station via a second subscription using a first frequency resource for the first and second subscriptions, means for changing the first connection for the first subscription by switching from the first frequency resource to a second frequency resource for the first connection, means for changing the second connection for a second subscription by switching from the first frequency resource to the second frequency resource for the second connection, in response to changing the first connection for the first subscription, and means for performing communication via at least one of the first subscription or the second subscription using the second frequency resource. In one aspect, the aforementioned means may be the processor(s) 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the processor-readable storage medium 1006, or any other suitable apparatus or means described in any one of the FIGS. 1, 2, 3, 7, and/or 8, and utilizing, for example, the processes and/or algorithms described herein in relation to FIG. 13.

Figure 14A:
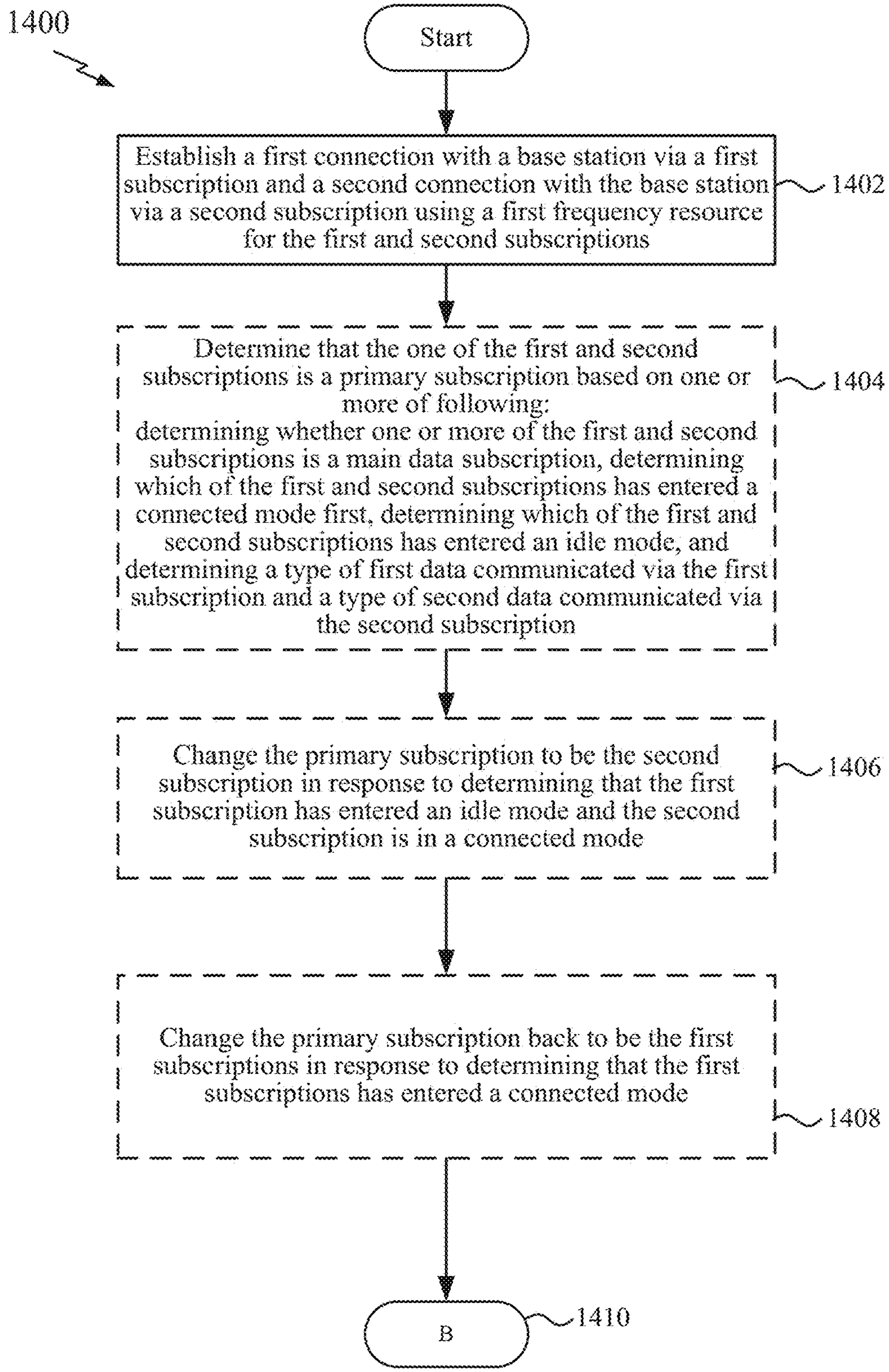
FIGS. 14A-14B are flow charts illustrating an exemplary process for wireless communication by a user equipment, according to some aspects of the disclosure.

FIG. 14A is a flow chart illustrating an exemplary process 1400 for wireless communication by a UE, in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the UE 1000 illustrated in FIG. 10. In some examples, the process 1400 may be carried out by any suitable apparatus or means for carrying out the functions or algorithm described below.

At block 1402, the process 1400 includes establishing a first connection with a base station via a first subscription and a second connection with the base station via a second subscription using a first frequency resource for the first and second subscriptions. In an aspect, the first connection and the second connection may be established with the base station using a same RAT.

At block 1404, the process 1400 may include determining that the one of the first and second subscriptions is a primary subscription based on one or more of following: determining whether one or more of the first and second subscriptions is a main data subscription, determining which of the first and second subscriptions has entered a connected mode first, determining which of the first and second subscriptions has entered an idle mode, and determining a type of first data communicated via the first subscription and a type of second data communicated via the second subscription.

In an aspect, the type of first data communicated via the first subscription may indicate a first priority and the type of first data communicated via the second subscription and a second priority, and the first subscription may be determined as the primary subscription based on the first priority associated with the first data and the second priority associated with the second data.

At block 1406, the process may include changing the primary subscription to be the second subscription in response to determining that the first subscription has entered an idle mode and the second subscription is in a connected mode.

At block 1408, the process may include changing the primary subscription back to be the first subscriptions in response to determining that the first subscriptions has entered a connected mode.

At block 1410, the process may include may include performing additional features shown in FIG. 14B below.

Figure 14B:
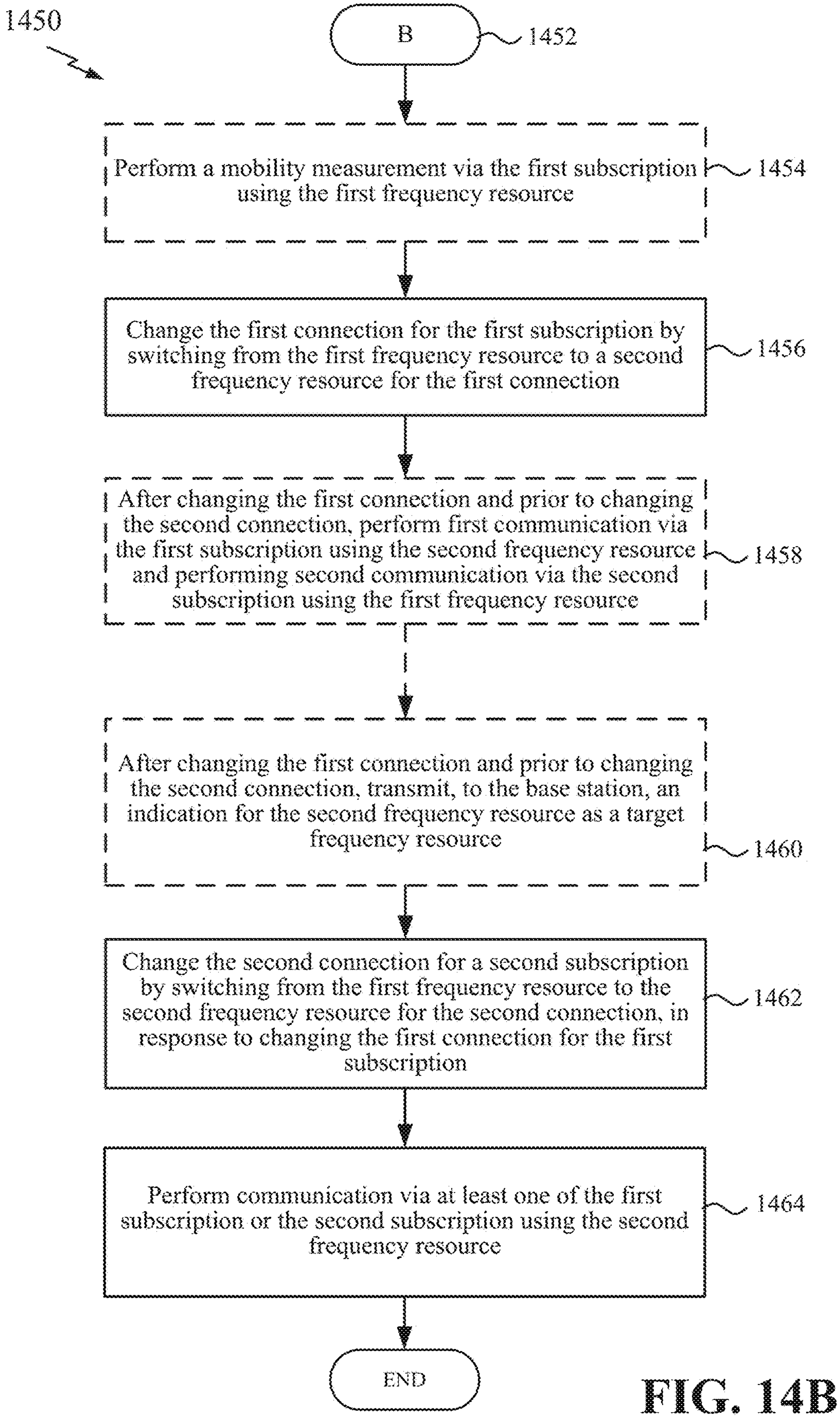

FIG. 14B is a flow chart illustrating an exemplary process 1450 for wireless communication by a UE, in accordance with some aspects of the present disclosure. As described below, some or all illustrated features may be omitted in a particular implementation within the scope of the present disclosure, and some illustrated features may not be required for implementation of all embodiments. In some examples, the process 1400 may be carried out by the UE 1000 illustrated in FIG. 10. In some examples, the process 1400 may be carried out by any suitable apparatus or means for carrying out the functions or algorithm described below. At block 1452, the process 1450 may continue from block 1410 of FIG. 14B.

At block 1454, the process 1400 may include performing a mobility measurement via the first subscription using the first frequency resource.

At block 1456, the process 1400 includes changing the first connection for the first subscription by switching from the first frequency resource to a second frequency resource for the first connection.

At block 1458, the process 1400 may include after changing the first connection and prior to changing the second connection, performing first communication via the first subscription using the second frequency resource and performing second communication via the second subscription using the first frequency resource.

At block 1460, the process 1400 may include after changing the first connection and prior to changing the second connection, transmitting, to the base station, an indication for the second frequency resource as a target frequency resource. In an aspect, the indication may be transmitted via UE assistance information.

At block 1462, the process 1400 includes changing the second connection for a second subscription by switching from the first frequency resource to the second frequency resource for the second connection, in response to changing the first connection for the first subscription.

In an aspect, changing the first connection for the first subscription may be based on the mobility measurement.

In an aspect, the first frequency resource may be associated with at least one of a first cell associated with the base station or a first BWP of the first cell, and the second frequency resource may be associated with at least one of a second cell associated with a second base station or a second BWP of the first cell.

At block 1464, the process 1400 includes performing communication via at least one of the first subscription or the second subscription using the second frequency resource.

In one configuration, the UE 1000 may include means for establishing a first connection with a base station via a first subscription and a second connection with the base station via a second subscription using a first frequency resource for the first and second subscriptions, means for changing the first connection for the first subscription by switching from the first frequency resource to a second frequency resource for the first connection, means for changing the second connection for a second subscription by switching from the first frequency resource to the second frequency resource for the second connection, in response to changing the first connection for the first subscription, and means for performing communication via at least one of the first subscription or the second subscription using the second frequency resource.

The UE 1000 may further include means for performing a mobility measurement via the first subscription using the first frequency resource, means for after changing the first connection and prior to changing the second connection, performing first communication via the first subscription using the second frequency resource and performing second communication via the second subscription using the first frequency resource, means for after changing the first connection and prior to changing the second connection, transmitting, to the base station, an indication for the second frequency resource as a target frequency resource, means for determining that the one of the first and second subscriptions is a primary subscription based on one or more of following: determining whether one or more of the first and second subscriptions is a main data subscription, determining which of the first and second subscriptions has entered a connected mode first, determining which of the first and second subscriptions has entered an idle mode, and determining a type of first data communicated via the first subscription and a type of second data communicated via the second subscription, means for changing the primary subscription to be the second subscription in response to determining that the first subscription has entered an idle mode and the second subscription is in a connected mode, and means for changing the primary subscription back to be the first subscriptions in response to determining that the first subscriptions has entered a connected mode.

In one aspect, the aforementioned means may be the processor(s) 1004 shown in FIG. 10 configured to perform the functions recited by the aforementioned means. In another aspect, the aforementioned means may be a circuit or any apparatus configured to perform the functions recited by the aforementioned means.

Of course, in the above examples, the circuitry included in the processor 1004 is merely provided as an example, and other means for carrying out the described functions may be included within various aspects of the present disclosure, including but not limited to the instructions stored in the processor-readable storage medium 906, or any other suitable apparatus or means described in any one of the FIGS. 1, 2, 3, 7, and/or 8, and utilizing, for example, the processes and/or algorithms described herein in relation to FIG. 14.

Figure 15:
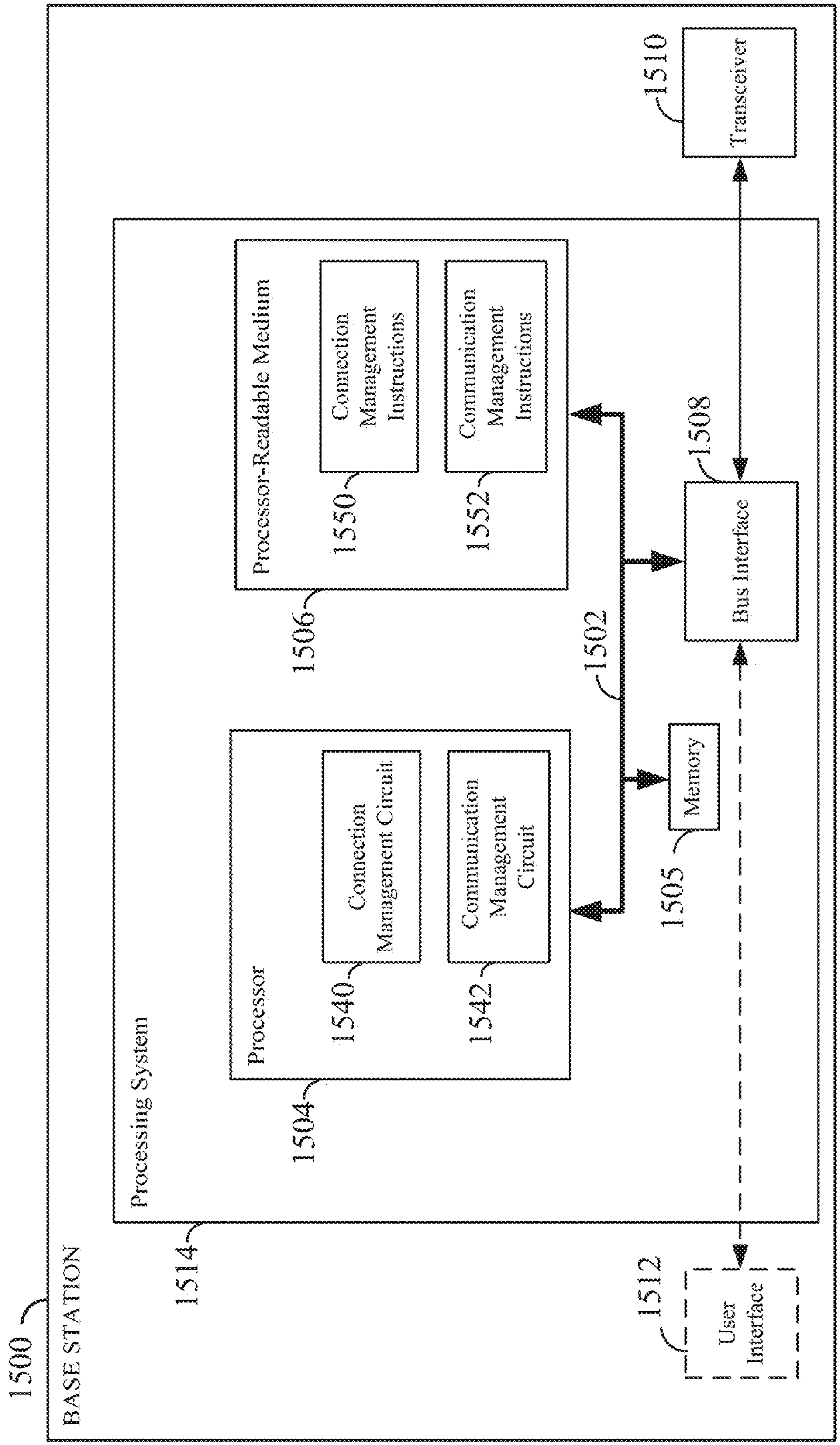
FIG. 15 is a block diagram conceptually illustrating an example of a hardware implementation for a base station according to some aspects of the disclosure.

FIG. 15 is a block diagram illustrating an example of a hardware implementation for a base station 1500 employing a processing system 1514. For example, the base station 1500 may be a base station as illustrated in any one or more of FIGS. 1, 2, 3, 7, and/or 8.

The base station 1500 may be implemented with a processing system 1514 that includes one or more processors 1504. Examples of processors 1504 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the base station 1500 may be configured to perform any one or more of the functions described herein. That is, the processor 1504, as utilized in a base station 1500, may be used to implement any one or more of the processes and procedures described below and illustrated in FIGS. 16-19.

In this example, the processing system 1514 may be implemented with a bus architecture, represented generally by the bus 1502. The bus 1502 may include any number of interconnecting buses and bridges depending on the specific application of the processing system 1514 and the overall design constraints. The bus 1502 communicatively couples together various circuits including one or more processors (represented generally by the processor 1504), a memory 1505, and processor-readable storage media (represented generally by the processor-readable storage medium 1506). The bus 1502 may also link various other circuits such as timing sources, peripherals, voltage regulators, and power management circuits, which are well known in the art, and therefore, will not be described any further. A bus interface 1508 provides an interface between the bus 1502 and a transceiver 1510. The transceiver 1510 provides a communication interface or means for communicating with various other apparatus over a transmission medium. Depending upon the nature of the apparatus, a user interface 1512 (e.g., keypad, display, speaker, microphone, joystick) may also be provided. Of course, such a user interface 1512 is optional, and may be omitted in some examples, such as a base station.

In some aspects of the disclosure, the processor 1504 may include connection management circuitry 1540 configured for various functions, including, for example, establishing a first connection through a communication link via a first subscription of a DSDS user equipment (UE) using a frequency resource, the DSDS UE being configured to communicate with at least two subscriptions. For example, the connection management circuitry 1540 may be configured to implement one or more of the functions described below in relation to FIGS. 16-17, including, e.g., blocks 1602 and 1702.

In some aspects of the disclosure, the connection management circuitry 1540 may be configured for various functions, including, for example, changing the first connection for the first subscription by switching from the first frequency resource on a first communication link to a second frequency resource on a second communication link for the first connection. For example, the connection management circuitry 1540 may be configured to implement one or more of the functions described below in relation to FIG. 17, including, e.g., block 1708.

In some aspects of the disclosure, the connection management circuitry 1540 may be configured for various functions, including, for example, establishing a second connection through the communication link via a second subscription of the DSDS UE using the frequency resource. For example, the connection management circuitry 1540 may be configured to implement one or more of the functions described below in relation to FIGS. 16-17, including, e.g., blocks 1604 and 1704.

In some aspects of the disclosure, the connection management circuitry 1540 may be configured for various functions, including, for example, establishing a first connection via a first subscription of a DSDS user equipment (UE) and a second connection via a second subscription of the DSDS UE using a first frequency resource for the first and second subscriptions, the DSDS UE being configured to communicate with at least two subscriptions. For example, the connection management circuitry 1540 may be configured to implement one or more of the functions described below in relation to FIGS. 18-19, including, e.g., blocks 1802 and 1902.

In some aspects of the disclosure, the connection management circuitry 1540 may be configured for various functions, including, for example, changing the first connection for the first subscription by switching from the first frequency resource to a second frequency resource for the first connection. For example, the connection management circuitry 1540 may be configured to implement one or more of the functions described below in relation to FIGS. 18-19, including, e.g., blocks 1804 and 1906.

In some aspects of the disclosure, the connection management circuitry 1540 may be configured for various functions, including, for example, changing the second connection for a second subscription by switching from the first frequency resource to the second frequency resource for the second connection, in response to changing the first connection for the first subscription. For example, the connection management circuitry 1540 may be configured to implement one or more of the functions described below in relation to FIGS. 18-19, including, e.g., blocks 1806 and 1912.

In some aspects of the disclosure, the processor 1504 may include communication management circuitry 1542 configured for various functions, including, for example, performing communication with the DSDS UE via at least one of the first subscription or the second subscription through the communication link using the frequency resource. For example, the communication management circuitry 1542 may be configured to implement one or more of the functions described below in relation to FIGS. 16-17, including, e.g., blocks 1606 and 1712.

In some aspects of the disclosure, the communication management circuitry 1542 may be configured for various functions, including, for example, transmitting, using one of either the first subscription or the second subscriptions, first control information associated with the first subscription and a first subscription identifier and second control information associated with the second subscription and a second subscription identifier. For example, the communication management circuitry 1542 may be configured to implement one or more of the functions described below in relation to FIG. 17, including, e.g., block 1706.

In some aspects of the disclosure, the communication management circuitry 1542 may be configured for various functions, including, for example, transmitting, using the first subscription, first control information associated with the first subscription based on resource. For example, the communication management circuitry 1542 may be configured to implement one or more of the functions described below in relation to FIG. 17, including, e.g., block 1710.

In some aspects of the disclosure, the communication management circuitry 1542 may be configured for various functions, including, for example, performing communication via at least one of the first subscription or the second subscription using the second frequency resource. For example, the communication management circuitry 1542 may be configured to implement one or more of the functions described below in relation to FIGS. 18-19, including, e.g., blocks 1808 and 1914.

In some aspects of the disclosure, the communication management circuitry 1542 may be configured for various functions, including, for example, transmitting, to the DSDS UE, one or more reference signals for a mobility measurement via the first subscription using the first frequency resource. For example, the communication management circuitry 1542 may be configured to implement one or more of the functions described below in relation to FIG. 19, including, e.g., block 1904.

In some aspects of the disclosure, the communication management circuitry 1542 may be configured for various functions, including, for example, after changing the first connection and prior to changing the second connection, performing first communication via the first subscription using the second frequency resource and performing second communication via the second subscription using the first frequency resource. For example, the communication management circuitry 1542 may be configured to implement one or more of the functions described below in relation to FIG. 19, including, e.g., block 1908.

In some aspects of the disclosure, the communication management circuitry 1542 may be configured for various functions, including, for example, after changing the first connection and prior to changing the second connection, receiving an indication for the second frequency resource as a target frequency resource. For example, the communication management circuitry 1542 may be configured to implement one or more of the functions described below in relation to FIG. 19, including, e.g., block 1910.

The processor 1504 is responsible for managing the bus 1502 and general processing, including the execution of software stored on the processor-readable storage medium 1506. The software, when executed by the processor 1504, causes the processing system 1514 to perform the various functions described below for any particular apparatus. The processor-readable storage medium 1506 and the memory 1505 may also be used for storing data that is manipulated by the processor 1504 when executing software.

One or more processors 1504 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a processor-readable storage medium 1506. The processor-readable storage medium 1506 may be a non-transitory processor-readable storage medium. A non-transitory processor-readable storage medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The processor-readable storage medium 1506 may reside in the processing system 1514, external to the processing system 1514, or distributed across multiple entities including the processing system 1514. The processor-readable storage medium 1506 may be embodied in a computer program product. By way of example, a computer program product may include a processor-readable storage medium in packaging materials. Those skilled in the art will recognize how best to implement the described functionality presented throughout this disclosure depending on the particular application and the overall design constraints imposed on the overall system.

In some aspects of the disclosure, the processor-readable storage medium 1506 may include connection management software/instructions 1550 configured for various functions, including, for example, establishing a first connection through a communication link via a first subscription of a DSDS user equipment (UE) using a frequency resource, the DSDS UE being configured to communicate with at least two subscriptions. For example, the connection management software/instructions 1550 may be configured to implement one or more of the functions described below in relation to FIGS. 16-17, including, e.g., blocks 1602 and 1702.

In some aspects of the disclosure, the connection management software/instructions 1550 may be configured for various functions, including, for example, changing the first connection for the first subscription by switching from the first frequency resource on a first communication link to a second frequency resource on a second communication link for the first connection. For example, the connection management software/instructions 1550 may be configured to implement one or more of the functions described below in relation to FIG. 17, including, e.g., block 1708.

In some aspects of the disclosure, the connection management software/instructions 1550 may be configured for various functions, including, for example, establishing a second connection through the communication link via a second subscription of the DSDS UE using the frequency resource. For example, the connection management software/instructions 1550 may be configured to implement one or more of the functions described below in relation to FIGS. 16-17, including, e.g., blocks 1604 and 1704.

In some aspects of the disclosure, the connection management software/instructions 1550 may be configured for various functions, including, for example, establishing a first connection via a first subscription of a DSDS user equipment (UE) and a second connection via a second subscription of the DSDS UE using a first frequency resource for the first and second subscriptions, the DSDS UE being configured to communicate with at least two subscriptions. For example, the connection management software/instructions 1550 may be configured to implement one or more of the functions described below in relation to FIGS. 18-19, including, e.g., blocks 1802 and 1902.

In some aspects of the disclosure, the connection management software/instructions 1550 may be configured for various functions, including, for example, changing the first connection for the first subscription by switching from the first frequency resource to a second frequency resource for the first connection. For example, the connection management software/instructions 1550 may be configured to implement one or more of the functions described below in relation to FIGS. 18-19, including, e.g., blocks 1804 and 1906.

In some aspects of the disclosure, the connection management software/instructions 1550 may be configured for various functions, including, for example, changing the second connection for a second subscription by switching from the first frequency resource to the second frequency resource for the second connection, in response to changing the first connection for the first subscription. For example, the connection management software/instructions 1550 may be configured to implement one or more of the functions described below in relation to FIGS. 18-19, including, e.g., blocks 1806 and 1912.

In some aspects of the disclosure, the processor-readable storage medium 1506 may include communication management software/instructions 1552 configured for various functions, including, for example, performing communication with the DSDS UE via at least one of the first subscription or the second subscription through the communication link using the frequency resource. For example, the communication management software/instructions 1552 may be configured to implement one or more of the functions described below in relation to FIGS. 16-17, including, e.g., blocks 1606 and 1712.

In some aspects of the disclosure, the communication management software/instructions 1552 may be configured for various functions, including, for example, transmitting, using one of either the first subscription or the second subscriptions, first control information associated with the first subscription and a first subscription identifier and second control information associated with the second subscription and a second subscription identifier. For example, the communication management software/instructions 1552 may be configured to implement one or more of the functions described below in relation to FIG. 17, including, e.g., block 1706.

In some aspects of the disclosure, the communication management software/instructions 1552 may be configured for various functions, including, for example, transmitting, using the first subscription, first control information associated with the first subscription based on a first subscription identifier on a first communication link via the first frequency resource. For example, the communication management software/instructions 1552 may be configured to implement one or more of the functions described below in relation to FIG. 17, including, e.g., block 1710.

In some aspects of the disclosure, the communication management software/instructions 1552 may be configured for various functions, including, for example, performing communication via at least one of the first subscription or the second subscription using the second frequency resource. For example, the communication management software/instructions 1552 may be configured to implement one or more of the functions described below in relation to FIGS. 18-19, including, e.g., blocks 1808 and 1914.

In some aspects of the disclosure, the communication management software/instructions 1552 may be configured for various functions, including, for example, transmitting, to the DSDS UE, one or more reference signals for a mobility measurement via the first subscription using the first frequency resource. For example, the communication management software/instructions 1552 may be configured to implement one or more of the functions described below in relation to FIG. 19, including, e.g., block 1904.

In some aspects of the disclosure, the communication management software/instructions 1552 may be configured for various functions, including, for example, after changing the first connection and prior to changing the second connection, performing first communication via the first subscription using the second frequency resource and performing second communication via the second subscription using the first frequency resource. For example, the communication management software/instructions 1552 may be configured to implement one or more of the functions described below in relation to FIG. 19, including, e.g., block 1908.

In some aspects of the disclosure, the communication management software/instructions 1552 may be configured for various functions, including, for example, after changing the first connection and prior to changing the second connection, receiving an indication for the second frequency resource as a target frequency resource. For example, the communication management software/instructions 1552 may be configured to implement one or more of the functions described below in relation to FIG. 19, including, e.g., block 1910.

Figure 16:
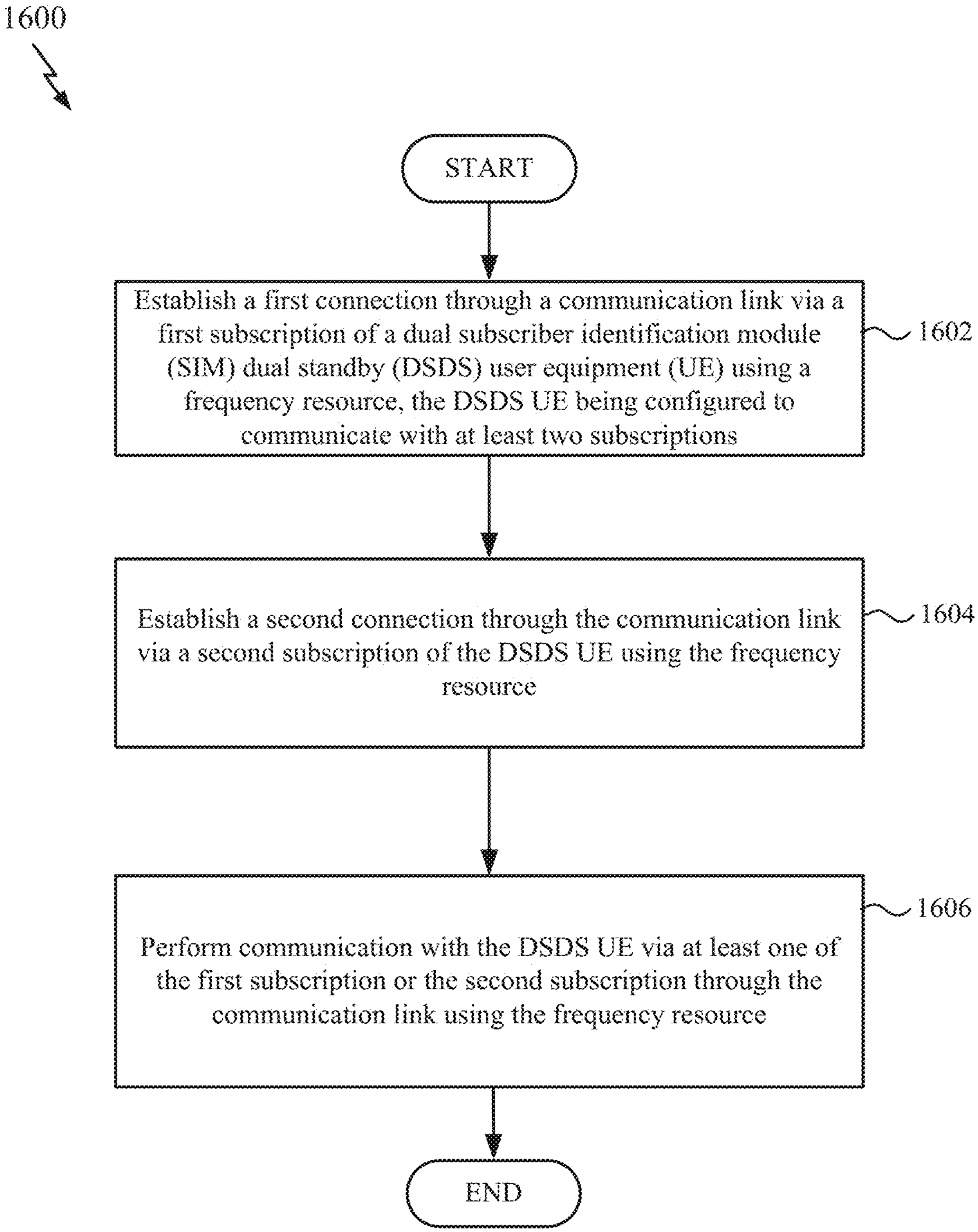
FIG. 16 is a flow chart illustrating an exemplary process for wireless communication by a base station, according to some aspects of the disclosure.

FIG. 16 is a flow chart illustrating an exemplary process 1600 for wireless communication by a base station, in accordance with some aspects of the present disclosure. As described below, some or all illustrated features may be omitted in a particular implementation within the scope of the present disclosure, and some illustrated features may not be required for implementation of all embodiments. In some examples, the process 1600 may be carried out by the base station 1500 illustrated in FIG. 15. In some examples, the process 1600 may be carried out by any suitable apparatus or means for carrying out the functions or algorithm described below.

At block 1602, the process 1600 includes establishing a first connection through a communication link via a first subscription of a DSDS user equipment (UE) using a frequency resource, the DSDS UE being configured to communicate with at least two subscriptions.

At block 1604, the process 1600 includes establishing a second connection through the communication link via a second subscription of the DSDS UE using the frequency resource.

At block 1606, the process 1600 includes performing communication with the DSDS UE via at least one of the first subscription or the second subscription through the communication link using the frequency resource.

In one configuration, the base station 1500 may include means for establishing a first connection through a communication link via a first subscription of a dual subscriber identification module (SIM) dual standby (DSDS) user equipment (UE) using a frequency resource, the DSDS UE being configured to communicate with at least two subscriptions, means for establishing a second connection through the communication link via a second subscription of the DSDS UE using the frequency resource, and means for performing communication with the DSDS UE via at least one of the first subscription or the second subscription through the communication link using the frequency resource. In one aspect, the aforementioned means may be the processor(s) 1504 shown in FIG. 15 configured to perform the functions recited by the aforementioned means. In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the processor-readable storage medium 1506, or any other suitable apparatus or means described in any one of the FIGS. 1, 2, 3, 5, and/or 8, and utilizing, for example, the processes and/or algorithms described herein in relation to FIG. 16.

Figure 17:
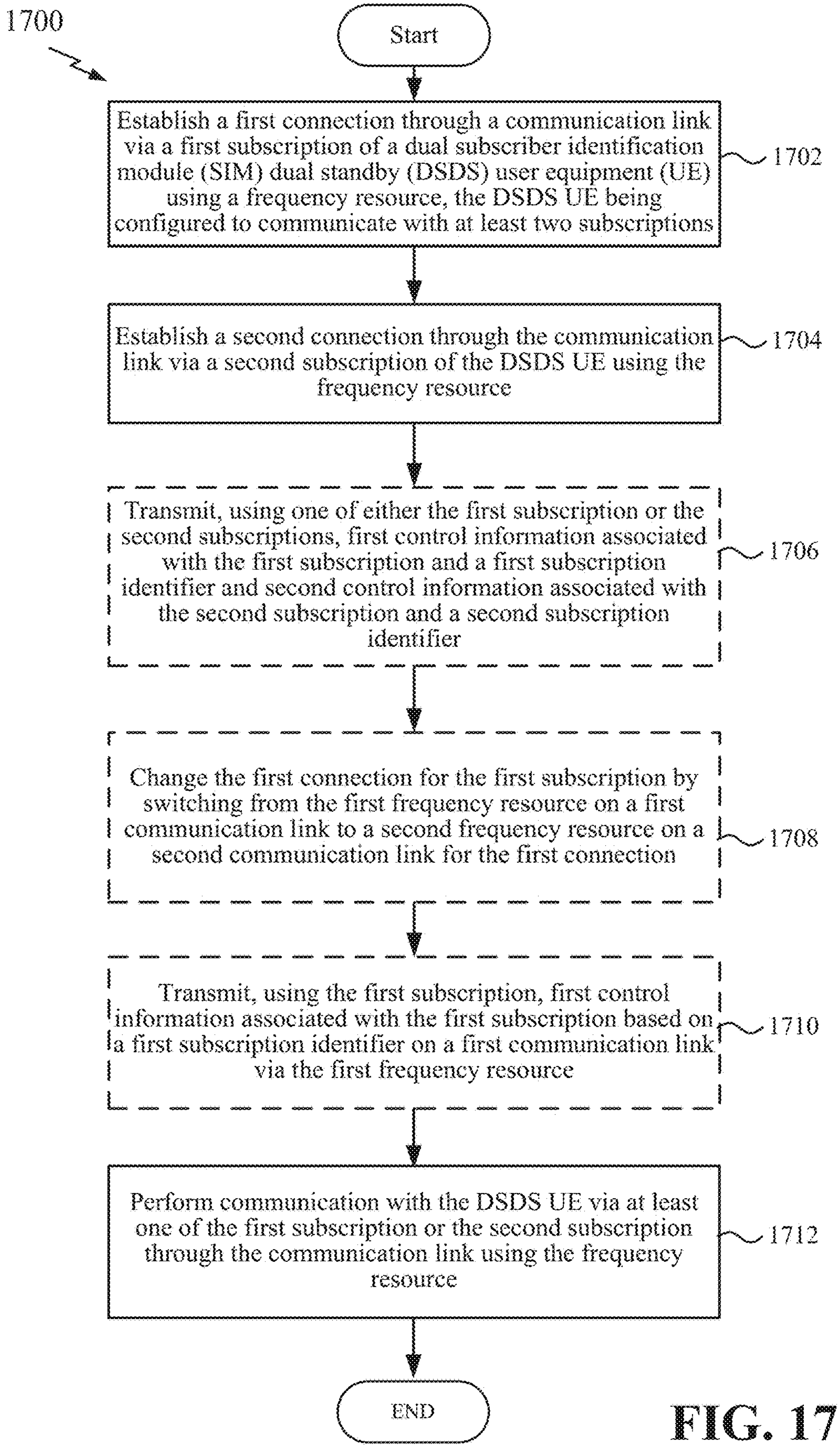
FIG. 17 is a flow chart illustrating an exemplary process for wireless communication by a base station, according to some aspects of the disclosure.

FIG. 17 is a flow chart illustrating an exemplary process 1700 for wireless communication by a base station, in accordance with some aspects of the present disclosure. As described below, some or all illustrated features may be omitted in a particular implementation within the scope of the present disclosure, and some illustrated features may not be required for implementation of all embodiments. In some examples, the process 1700 may be carried out by the base station 1500 illustrated in FIG. 15. In some examples, the process 1700 may be carried out by any suitable apparatus or means for carrying out the functions or algorithm described below.

At block 1702, the process 1700 includes establishing a first connection through a communication link via a first subscription of a DSDS user equipment (UE) using a frequency resource, the DSDS UE being configured to communicate with at least two subscriptions.

At block 1704, the process 1700 includes establishing a second connection through the communication link via a second subscription of the DSDS UE using the frequency resource.

In an aspect, the first connection and the second connection may be established with the base station using a same RAT. In an aspect, the communication link may be a frequency channel between the DSDS UE and the base station.

At block 1706, the process 1700 may include transmitting, using one of either the first subscription or the second subscriptions, first control information associated with the first subscription and a first subscription identifier and second control information associated with the second subscription and a second subscription identifier.

In an aspect, the first control information and the second control information may be first DCI and second DCI, respectively, where transmitting the first control information and the second control information may include transmitting a PDCCH with the first subscription identifier for the first DCI and with the second subscription identifier for the second DCI. In an aspect, the first subscription identifier may be a first C-RNTI and the second subscription identifier may be a second C-RNTI.

At block 1708, the process 1700 may include changing the first connection for the first subscription by switching from the first frequency resource on a first communication link to a second frequency resource on a second communication link for the first connection.

At block 1710, the process 1700 may include transmitting, using the first subscription, first control information associated with the first subscription based on a first subscription identifier on a first communication link via the first frequency resource.

In an aspect, the second control information associated with the second subscription may be transmitted based on a second subscription identifier on a second communication link via the second frequency resource.

At block 1712, the process 1700 includes performing communication with the DSDS UE via at least one of the first subscription or the second subscription through the communication link using the frequency resource.

In an aspect, the communication with the DSDS UE may be performed based on the first control information and for the second control information.

In an aspect, performing the communication may include: receiving uplink communication based on at least one of the first control information or the second control information respectively associated with the at least one of the first subscription or the second subscription if the at least one of the first control information or the second control information includes an uplink scheduling grant, and performing downlink communication based on the at least one of the first control information or the second control information respectively associated with the at least one of the first subscription or the second subscription if the at least one of the first control information or the second control information includes a downlink scheduling assignment. In an aspect, the uplink communication may be PUSCH communication and the downlink communication may be PDSCH communication.

In one configuration, the base station 1500 may include means for establishing a first connection through a communication link via a first subscription of a DSDS user equipment (UE) using a frequency resource, the DSDS UE being configured to communicate with at least two subscriptions, means for establishing a second connection through the communication link via a second subscription of the DSDS UE using the frequency resource, and means for performing communication with the DSDS UE via at least one of the first subscription or the second subscription through the communication link using the frequency resource. The base station 1500 may further include means for transmitting, using one of either the first subscription or the second subscriptions, first control information associated with the first subscription and a first subscription identifier and second control information associated with the second subscription and a second subscription identifier, means for changing the first connection for the first subscription by switching from the first frequency resource on a first communication link to a second frequency resource on a second communication link for the first connection, and means for transmitting, using the first subscription, first control information associated with the first subscription based on a first subscription identifier on a first communication link via the first frequency resource. In one aspect, the aforementioned means may be the processor(s) 1504 shown in FIG. 15 configured to perform the functions recited by the aforementioned means. In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the processor-readable storage medium 1506, or any other suitable apparatus or means described in any one of the FIGS. 1, 2, 3, 5, and/or 8, and utilizing, for example, the processes and/or algorithms described herein in relation to FIG. 17.

Figure 18:
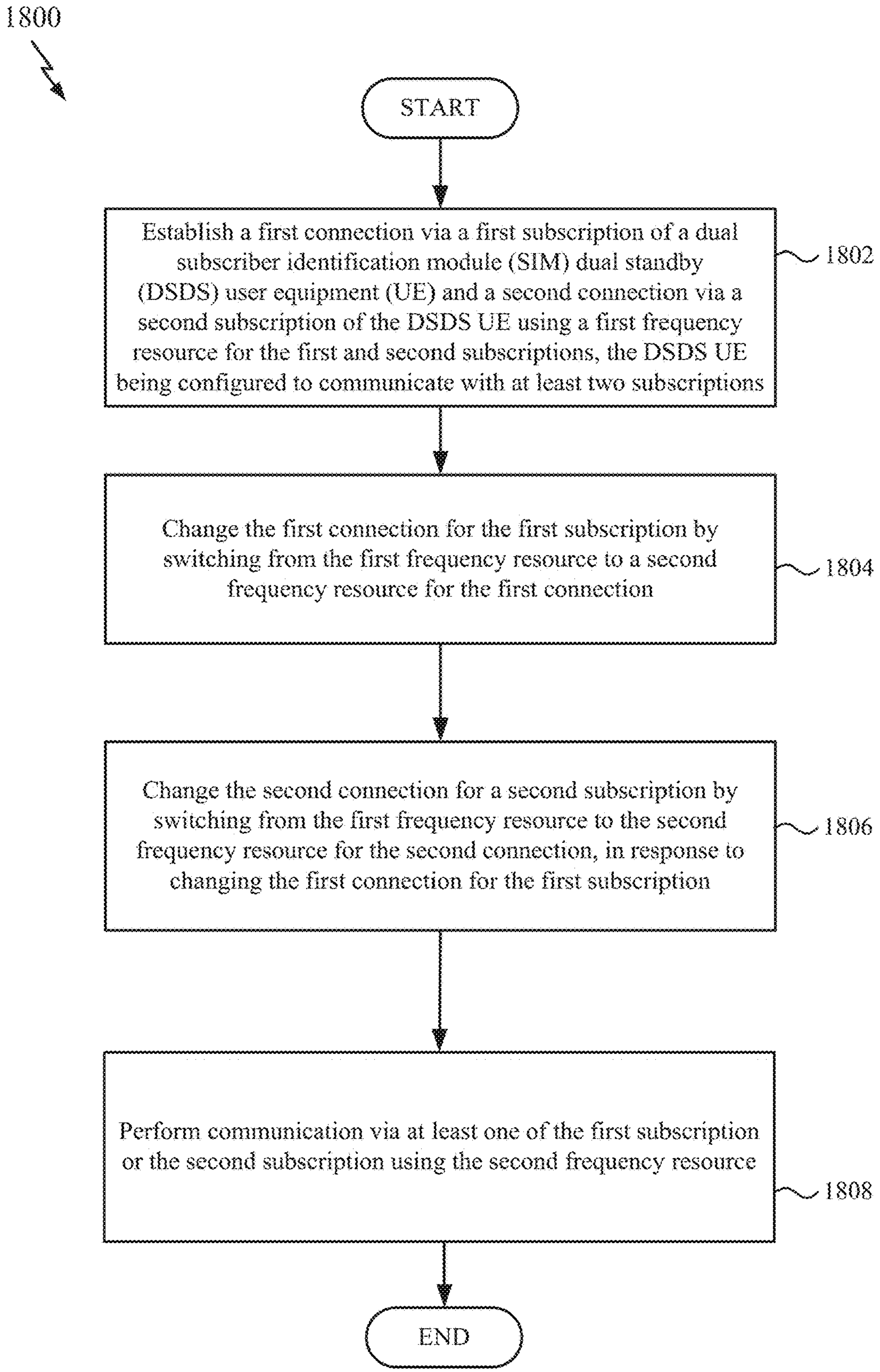
FIG. 18 is a flow chart illustrating an exemplary process for wireless communication by a base station, according to some aspects of the disclosure.

FIG. 18 is a flow chart illustrating an exemplary process 1800 for wireless communication by a base station, in accordance with some aspects of the present disclosure. As described below, some or all illustrated features may be omitted in a particular implementation within the scope of the present disclosure, and some illustrated features may not be required for implementation of all embodiments. In some examples, the process 1800 may be carried out by the base station 1500 illustrated in FIG. 15. In some examples, the process 1800 may be carried out by any suitable apparatus or means for carrying out the functions or algorithm described below.

At block 1802, the process 1800 includes establishing a first connection via a first subscription of a DSDS user equipment (UE) and a second connection via a second subscription of the DSDS UE using a first frequency resource for the first and second subscriptions, the DSDS UE being configured to communicate with at least two subscriptions.

At block 1804, the process 1800 includes changing the first connection for the first subscription by switching from the first frequency resource to a second frequency resource for the first connection At block 1806, the process 1800 includes changing the second connection for a second subscription by switching from the first frequency resource to the second frequency resource for the second connection, in response to changing the first connection for the first subscription.

At block 1808, the process 1800 includes performing communication via at least one of the first subscription or the second subscription using the second frequency resource.

In one configuration, the base station 1500 may include means for establishing a first connection via a first subscription of a DSDS user equipment (UE) and a second connection via a second subscription of the DSDS UE using a first frequency resource for the first and second subscriptions, the DSDS UE being configured to communicate with at least two subscriptions, means for changing the first connection for the first subscription by switching from the first frequency resource to a second frequency resource for the first connection, means for changing the second connection for a second subscription by switching from the first frequency resource to the second frequency resource for the second connection, in response to changing the first connection for the first subscription, and means for performing communication via at least one of the first subscription or the second subscription using the second frequency resource. In one aspect, the aforementioned means may be the processor(s) 1504 shown in FIG. 15 configured to perform the functions recited by the aforementioned means. In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the processor-readable storage medium 1506, or any other suitable apparatus or means described in any one of the FIGS. 1, 2, 3, 5, and/or 8, and utilizing, for example, the processes and/or algorithms described herein in relation to FIG. 18.

Figure 19:
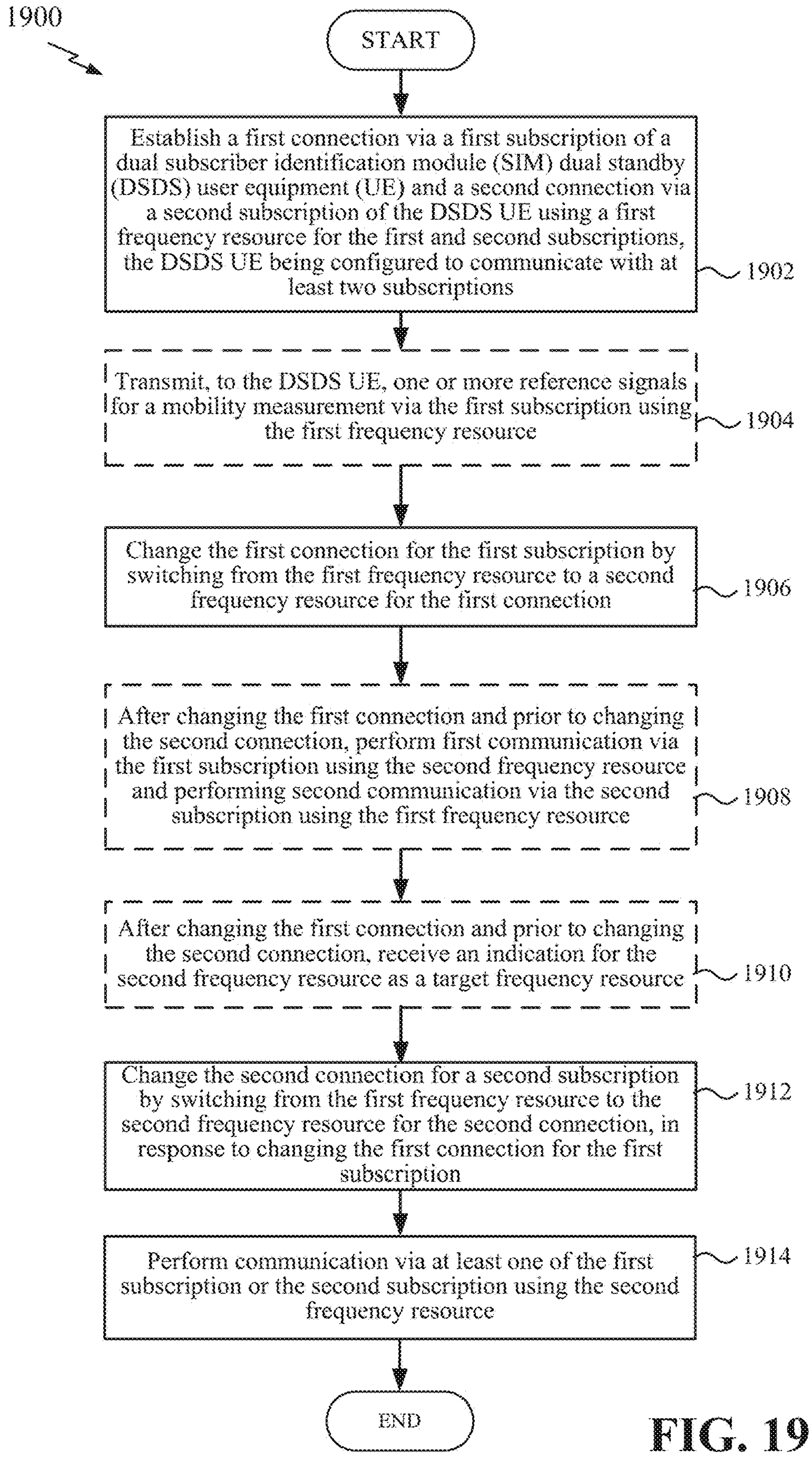
FIG. 19 is a flow chart illustrating an exemplary process for wireless communication by a base station, according to some aspects of the disclosure.

FIG. 19 is a flow chart illustrating an exemplary process 1900 for wireless communication by a base station, in accordance with some aspects of the present disclosure. As described below, some or all illustrated features may be omitted in a particular implementation within the scope of the present disclosure, and some illustrated features may not be required for implementation of all embodiments. In some examples, the process 1900 may be carried out by the base station 1500 illustrated in FIG. 15. In some examples, the process 1900 may be carried out by any suitable apparatus or means for carrying out the functions or algorithm described below.

At block 1902, the process 1900 includes establishing a first connection via a first subscription of a DSDS user equipment (UE) and a second connection via a second subscription of the DSDS UE using a first frequency resource for the first and second subscriptions, the DSDS UE being configured to communicate with at least two subscriptions. In an aspect, the first connection and the second connection may be established with the base station using a same RAT.

At block 1904, the process 1900 may include transmitting, to the DSDS UE, one or more reference signals for a mobility measurement via the first subscription using the first frequency resource.

At block 1906, the process 1900 includes changing the first connection for the first subscription by switching from the first frequency resource to a second frequency resource for the first connection.

In an aspect, changing the first connection for the first subscription may be based on the mobility measurement.

At block 1908, the process 1900 may include after changing the first connection and prior to changing the second connection, performing first communication via the first subscription using the second frequency resource and performing second communication via the second subscription using the first frequency resource.

At block 1910, the process 1900 may include after changing the first connection and prior to changing the second connection, receiving an indication for the second frequency resource as a target frequency resource.

At block 1912, the process 1900 includes changing the second connection for a second subscription by switching from the first frequency resource to the second frequency resource for the second connection, in response to changing the first connection for the first subscription.

In an aspect, changing the second connection may be based on the indication.

At block 1914, the process 1900 includes performing communication via at least one of the first subscription or the second subscription using the second frequency resource.

In one configuration, the base station 1500 may include means for establishing a first connection via a first subscription of a DSDS user equipment (UE) and a second connection via a second subscription of the DSDS UE using a first frequency resource for the first and second subscriptions, the DSDS UE being configured to communicate with at least two subscriptions, means for changing the first connection for the first subscription by switching from the first frequency resource to a second frequency resource for the first connection, means for changing the second connection for a second subscription by switching from the first frequency resource to the second frequency resource for the second connection, in response to changing the first connection for the first subscription, and means for performing communication via at least one of the first subscription or the second subscription using the second frequency resource. The base station 1500 may further include means for transmitting, to the DSDS UE, one or more reference signals for a mobility measurement via the first subscription using the first frequency resource, means for after changing the first connection and prior to changing the second connection, performing first communication via the first subscription using the second frequency resource and performing second communication via the second subscription using the first frequency resource, and means for after changing the first connection and prior to changing the second connection, receiving an indication for the second frequency resource as a target frequency resource. In one aspect, the aforementioned means may be the processor(s) 1504 shown in FIG. 15 configured to perform the functions recited by the aforementioned means. In another aspect, the aforementioned means may be a circuit or any apparatus configured to perform the functions recited by the aforementioned means.

Of course, in the above examples, the circuitry included in the processor 1504 is merely provided as an example, and other means for carrying out the described functions may be included within various aspects of the present disclosure, including but not limited to the instructions stored in the processor-readable storage medium 1506, or any other suitable apparatus or means described in any one of the FIGS. 1, 2, 3, 5, and/or 8, and utilizing, for example, the processes and/or algorithms described herein in relation to FIG. 19.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-19 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-19 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

The invention claimed is:

1. A method of wireless communication by a dual subscriber identification module (SIM) dual standby (DSDS) user equipment (UE) configured to communicate with at least two subscriptions, comprising:

establishing a first connection with a base station through a communication link via a first subscription using a frequency resource;

establishing a second connection with the base station through the communication link via a second subscription using the frequency resource, the frequency resource being commonly used by the first subscription and the second subscription respectively for the first connection and the second connection; and performing communication with the base station via at least one of the first subscription or the second subscription through the communication link using the frequency resource.

2. The method of claim 1, further comprising:

monitoring, using one of either the first subscription or the second subscription, for first control information associated with the first subscription based on a first subscription identifier and for second control information associated with the second subscription based on a second subscription identifier, wherein the communication with the base station is performed based on monitoring for the first control information and for the second control information.

3. The method of claim 2, wherein the first control information and the second control information are first downlink control information (DCI) and second DCI, respectively, and wherein monitoring for the first control information and for the second control information comprises:

monitoring a physical downlink control channel (PDCCH) with the first subscription identifier for the first DCI and with the second subscription identifier for the second DCI.

4. The method of claim 2, wherein the first subscription identifier is a first cell radio network temporary identifier (C-RNTI) and the second subscription identifier is a second C-RNTI.

5. The method of claim 2, wherein performing the communication comprises:

performing uplink communication based on at least one of the first control information or the second control information respectively associated with the at least one of the first subscription or the second subscription if the at least one of the first control information or the second control information includes an uplink scheduling grant; and receiving downlink communication based on the at least one of the first control information or the second control information respectively associated with the at least one of the first subscription or the second subscription if the at least one of the first control information or the second control information includes a downlink scheduling assignment.

6. The method of claim 5, wherein the uplink communication is physical uplink shared channel (PUSCH) communication and the downlink communication is physical downlink shared channel (PDSCH) communication.

7. The method of claim 1, further comprising:

changing the first connection for the first subscription by switching from the first frequency resource on a first communication link to a second frequency resource on a second communication link for the first connection;

monitoring, using the first subscription, for first control information associated with the first subscription based on a first subscription identifier on a first communication link via the first frequency resource; and monitoring, using the second subscription, for second control information associated with the second subscription based on a second subscription identifier on a second communication link via the second frequency resource.

8. The method of claim 2, further comprising:

determining that the one of the first and second subscriptions is a primary subscription based on one or more of following:

determining whether one or more of the first and second subscriptions is a main data subscription, determining which of the first and second subscriptions has entered a connected mode first, determining which of the first and second subscriptions has entered an idle mode, and determining a type of first data communicated via the first subscription and a type of second data communicated via the second subscription, wherein the one of the first and second subscriptions is used for monitoring for the first control information and the second information in response to determining that the one of the first and second subscriptions is the primary subscription.

9. The method of claim 8, wherein the type of data communicated via the first subscription indicates a first priority and the type of data communicated via the second subscription indicates a second priority, and wherein the one of the first and second subscriptions is determined as the primary subscription based on the first priority associated with the first data and the second priority associated with the second data.

10. The method of claim 8, further comprising:

changing the primary subscription to be the other one of the first and second subscriptions in response to determining that the one of the first and second subscriptions has entered an idle mode and the other one of the first and second subscriptions is in a connected mode.

11. The method of claim 10, further comprising:

changing the primary subscription back to be the one of the first and second subscriptions in response to determining that the one of the first and second subscriptions has entered a connected mode.

12. The method of claim 1, wherein the first connection and the second connection are established with the base station using a same radio access technology (RAT).

13. The method of claim 1, wherein the communication link is a frequency channel between the DSDS UE and the base station.

14. The method of claim 1, wherein performing communication with the base station comprises:

receiving simultaneously first downlink communication via the first subscription and second downlink communication via the second subscription through the communication link using the frequency resource.

15. A dual subscriber identification module (SIM) dual standby (DSDS) user equipment (UE) configured to communicate with at least two subscriptions for wireless communication, comprising:

at least one processor;

a transceiver communicatively coupled to the at least one processor; and a memory communicatively coupled to the at least one processor, wherein the at least one processor is configured to:

establish a first connection with a base station through a communication link via a first subscription using a frequency resource;

establish a second connection with the base station through the communication link via a second subscription using the frequency resource, the frequency resource being commonly used by the first subscription and the second subscription respectively for the first connection and the second connection; and perform communication with the base station via at least one of the first subscription or the second subscription through the communication link using the frequency resource.

16. The DSDS UE of claim 15, wherein the at least one processor is further configured to:

monitor, using one of one of either the first subscription or the second subscription, for first control information associated with the first subscription based on a first subscription identifier and for second control information associated with the second subscription based on a second subscription identifier, wherein the communication with the base station is performed based on monitoring for the first control information and for the second control information.

17. The DSDS UE of claim 16, wherein the first control information and the second control information are first downlink control information (DCI) and second DCI, respectively, and wherein the at least one processor configured to monitor for the first control information and for the second control information is configured to:

monitor a physical downlink control channel (PDCCH) with the first subscription identifier for the first DCI and with the second subscription identifier for the second DCI.

18. The DSDS UE of claim 16, wherein the at least one processor configured to perform the communication is configured to:

perform uplink communication based on at least one of the first control information or the second control information respectively associated with the at least one of the first subscription or the second subscription if the at least one of the first control information or the second control information includes an uplink scheduling grant; and receive downlink communication based on the at least one of the first control information or the second control information respectively associated with the at least one of the first subscription or the second subscription if the at least one of the first control information or the second control information includes a downlink scheduling assignment.

19. A method of wireless communication by a base station, comprising:

establishing a first connection through a communication link via a first subscription of a dual subscriber identification module (SIM) dual standby (DSDS) user equipment (UE) using a frequency resource, the DSDS UE being configured to communicate with at least two subscriptions;

establishing a second connection through the communication link via a second subscription of the DSDS UE using the frequency resource, the frequency resource being commonly used by the first subscription and the second subscription respectively for the first connection and the second connection; and performing communication with the DSDS UE via at least one of the first subscription or the second subscription through the communication link using the frequency resource.

20. The method of claim 19, further comprising:

transmitting, using one of either the first subscription or the second subscriptions, first control information associated with the first subscription and a first subscription identifier and second control information associated with the second subscription and a second subscription identifier, wherein the communication with the DSDS UE is performed based on the first control information and for the second control information.

21. The method of claim 20, wherein the first control information and the second control information are first downlink control information (DCI) and second DCI, respectively, and wherein transmitting the first control information and the second control information comprises:

transmitting a physical downlink control channel (PDCCH) with the first subscription identifier for the first DCI and with the second subscription identifier for the second DCI.

22. The method of claim 20, wherein the first subscription identifier is a first cell radio network temporary identifier (C-RNTI) and the second subscription identifier is a second C-RNTI.

23. The method of claim 20, wherein performing the communication comprises:

receiving uplink communication based on at least one of the first control information or the second control information respectively associated with the at least one of the first subscription or the second subscription if the at least one of the first control information or the second control information includes an uplink scheduling grant; and performing downlink communication based on the at least one of the first control information or the second control information respectively associated with the at least one of the first subscription or the second subscription if the at least one of the first control information or the second control information includes a downlink scheduling assignment.

24. The method of claim 23, wherein the uplink communication is physical uplink shared channel (PUSCH) communication and the downlink communication is physical downlink shared channel (PDSCH) communication.

25. The method of claim 20, further comprising:

changing the first connection for the first subscription by switching from the first frequency resource on a first communication link to a second frequency resource on a second communication link for the first connection; and transmitting, using the first subscription, first control information associated with the first subscription based on a first subscription identifier on a first communication link via the first frequency resource, wherein the second control information associated with the second subscription is transmitted based on a second subscription identifier on a second communication link via the second frequency resource.

26. The method of claim 19, wherein the first connection and the second connection are established with the base station using a same radio access technology (RAT).

27. The method of claim 19, wherein the communication link is a frequency channel between the DSDS UE and the base station.

28. A base station for wireless communication, comprising:

at least one processor;

a transceiver communicatively coupled to the at least one processor; and a memory communicatively coupled to the at least one processor, wherein the at least one processor is configured to:

establish a first connection through a communication link via a first subscription of a dual subscriber identification module (SIM) dual standby (DSDS) user equipment (UE) using a frequency resource, the DSDS UE being configured to communicate with at least two subscriptions;

establish a second connection through the communication link via a second subscription of the DSDS UE using the frequency resource, the frequency resource being commonly used by the first subscription and the second subscription respectively for the first connection and the second connection; and perform communication with the DSDS UE via at least one of the first subscription or the second subscription through the communication link using the frequency resource.

29. The base station of claim 28, wherein the at least one processor is configured to:

transmit, using one of either the first subscription or the second subscriptions, first control information associated with the first subscription and a first subscription identifier and second control information associated with the second subscription and a second subscription identifier, wherein the communication with the DSDS UE is performed based on the first control information and for the second control information.

30. The base station of claim 29, wherein the first control information and the second control information are first downlink control information (DCI) and second DCI, respectively, and wherein the at least one processor configured to transmit the first control information and the second control information is configured to:

transmit a physical downlink control channel (PDCCH) with the first subscription identifier for the first DCI and with the second subscription identifier for the second DCI.

* * * * *